(12) United States Patent
Fix et al.

(10) Patent No.: US 9,519,043 B2
(45) Date of Patent: Dec. 13, 2016

(54) ESTIMATING NETWORK BASED LOCATING ERROR IN WIRELESS NETWORKS

(75) Inventors: Jeremy Fix, Acworth, GA (US); Mario Kosseifi, Roswell, GA (US); Sheldon Meredith, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 310 days.

(21) Appl. No.: 13/188,136

(22) Filed: Jul. 21, 2011

(65) Prior Publication Data

US 2013/0021199 A1  Jan. 24, 2013

(51) Int. Cl.
  *G01S 5/02*  (2010.01)
  *G01S 19/41*  (2010.01)

(52) U.S. Cl.
  CPC .............. *G01S 5/021* (2013.01); *G01S 5/0263* (2013.01); *G01S 19/41* (2013.01)

(58) Field of Classification Search
  CPC ....................................................... G01S 5/021
  USPC .............. 342/450, 463–465, 357.31; 73/1.79
  See application file for complete search history.

(56) References Cited

U.S. PATENT DOCUMENTS

| | | |
|---|---|---|
| 4,718,081 A | 1/1988 | Brenig |
| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |
| 5,831,545 A * | 11/1998 | Murray .............. H04B 7/18552 340/7.22 |
| 5,844,521 A | 12/1998 | Stephens et al. |
| 5,982,324 A | 11/1999 | Watters et al. |
| 6,018,312 A | 1/2000 | Haworth |
| 6,026,301 A | 2/2000 | Satarasinghe |
| 6,058,260 A | 5/2000 | Brockel et al. |

(Continued)

FOREIGN PATENT DOCUMENTS

| | | |
|---|---|---|
| EP | 0856746 A2 | 8/1998 |
| EP | 1145526 | 10/2001 |

(Continued)

OTHER PUBLICATIONS

M. Rabinowitz et al., A new positioning system using television synchronization signals, IEEE Transactions on Broadcasting, vol. 51(1), p. 51-61, Mar. 2005.*

(Continued)

*Primary Examiner* — Gregory C Issing
*Assistant Examiner* — Fred H Mull
(74) *Attorney, Agent, or Firm* — Amin, Turocy & Watson, LLP

(57) ABSTRACT

Systems and techniques for determining the accuracy of network based user equipment (UE) locating methods and results thereof are disclosed. Periodic direct measurements of location error for a network based location result are determined by the difference in the network based location result and an assisted global positioning system (AGPS) location result. The location error is associated with a cell-pair contributing to data employed to determine the network based location result. The error associated with the cell-pair is then applied as a measure of accuracy in future network based location results that also employ data associated with the cell-pair to determine the future network based location result.

18 Claims, 10 Drawing Sheets

(56) References Cited

U.S. PATENT DOCUMENTS

| | | | |
|---|---|---|---|
| 6,108,532 A | 8/2000 | Matsuda et al. | |
| 6,108,556 A | 8/2000 | Ito | |
| 6,125,125 A | 9/2000 | Narasimha et al. | |
| 6,148,219 A | 11/2000 | Engelbrecht et al. | |
| 6,216,002 B1 | 4/2001 | Holmring | |
| 6,230,018 B1* | 5/2001 | Watters et al. | 455/456.3 |
| 6,256,577 B1 | 7/2001 | Graunke | |
| 6,263,190 B1 | 7/2001 | Mamori et al. | |
| 6,292,665 B1* | 9/2001 | Hildebrand | H04W 64/00 342/357.31 |
| 6,298,233 B1 | 10/2001 | Souissi et al. | |
| 6,307,503 B1 | 10/2001 | Liu et al. | |
| 6,311,078 B1 | 10/2001 | Hardouin et al. | |
| 6,317,686 B1 | 11/2001 | Ran et al. | |
| 6,321,092 B1 | 11/2001 | Fitch et al. | |
| 6,330,459 B1 | 12/2001 | Crichton et al. | |
| 6,351,235 B1 | 2/2002 | Stilp | |
| 6,353,778 B1 | 3/2002 | Brown et al. | |
| 6,397,074 B1* | 5/2002 | Pihl et al. | 455/456.2 |
| 6,405,047 B1 | 6/2002 | Moon | |
| 6,407,703 B1 | 6/2002 | Minter et al. | |
| 6,429,815 B1 | 8/2002 | Soliman | |
| 6,434,396 B1* | 8/2002 | Rune | 455/502 |
| 6,449,486 B1* | 9/2002 | Rao | 455/456.1 |
| 6,453,168 B1 | 9/2002 | McCrady et al. | |
| 6,493,539 B1 | 12/2002 | Falco et al. | |
| 6,515,623 B2 | 2/2003 | Johnson | |
| 6,522,296 B2 | 2/2003 | Holt | |
| 6,526,335 B1 | 2/2003 | Treyz et al. | |
| 6,552,682 B1 | 4/2003 | Fan | |
| 6,560,532 B2 | 5/2003 | Cayford | |
| 6,560,567 B1 | 5/2003 | Yechuri et al. | |
| 6,594,576 B2 | 7/2003 | Fan et al. | |
| 6,604,083 B1 | 8/2003 | Bailey et al. | |
| 6,668,226 B2 | 12/2003 | Sutanto et al. | |
| 6,690,292 B1 | 2/2004 | Meadows et al. | |
| 6,744,383 B1 | 6/2004 | Alfred et al. | |
| 6,744,740 B2 | 6/2004 | Chen | |
| 6,757,545 B2 | 6/2004 | Nowak et al. | |
| 6,801,782 B2 | 10/2004 | McCrady et al. | |
| 6,801,855 B1 | 10/2004 | Walters et al. | |
| 6,816,782 B1 | 11/2004 | Walters et al. | |
| 6,850,761 B2 | 2/2005 | Pallonen | |
| 6,892,054 B2 | 5/2005 | Belcher et al. | |
| 6,915,123 B1 | 7/2005 | Daudelin et al. | |
| 6,933,100 B2 | 8/2005 | Igawa et al. | |
| 6,933,860 B1 | 8/2005 | Gehman et al. | |
| 7,058,710 B2 | 6/2006 | McCall et al. | |
| 7,065,349 B2 | 6/2006 | Nath et al. | |
| 7,098,805 B2 | 8/2006 | Meadows et al. | |
| 7,113,793 B2 | 9/2006 | Veerasamy et al. | |
| 7,149,534 B2 | 12/2006 | Bloebaum et al. | |
| 7,181,218 B2 | 2/2007 | Ovesjo | |
| 7,277,049 B2 | 10/2007 | Korneluk et al. | |
| 7,289,039 B2 | 10/2007 | Kato et al. | |
| 7,346,359 B2 | 3/2008 | Damarla et al. | |
| 7,359,719 B1 | 4/2008 | Duffett-Smith et al. | |
| 7,366,492 B1 | 4/2008 | Ganesh | |
| 7,375,649 B2 | 5/2008 | Gueziec | |
| 7,420,464 B2 | 9/2008 | Fitzgerald et al. | |
| 7,432,829 B2 | 10/2008 | Poltorak | |
| 7,436,794 B2 | 10/2008 | Takahashi et al. | |
| 7,463,143 B2 | 12/2008 | Forr et al. | |
| 7,508,321 B2 | 3/2009 | Gueziec | |
| 7,664,492 B1 | 2/2010 | Lee et al. | |
| 7,696,922 B2 | 4/2010 | Nicholson et al. | |
| 7,697,917 B2 | 4/2010 | Camp et al. | |
| 7,706,964 B2 | 4/2010 | Horvitz et al. | |
| 7,744,740 B2 | 6/2010 | Diehl | |
| 7,747,258 B2 | 6/2010 | Farmer et al. | |
| 7,761,225 B2 | 7/2010 | Vaughn | |
| 7,831,380 B2 | 11/2010 | Chapman et al. | |
| 7,848,880 B2 | 12/2010 | Cheung | |
| 7,890,299 B2 | 2/2011 | Fok et al. | |
| 7,917,156 B2 | 3/2011 | Sheynblat et al. | |
| 7,945,271 B1 | 5/2011 | Barnes et al. | |
| 7,958,001 B2 | 6/2011 | Abbadessa et al. | |
| 7,962,162 B2 | 6/2011 | McNair | |
| 7,962,280 B2 | 6/2011 | Kindo et al. | |
| 7,994,981 B1 | 8/2011 | Farrokhi et al. | |
| 7,996,020 B1 | 8/2011 | Chhabra | |
| 8,000,726 B2 | 8/2011 | Altman et al. | |
| 8,005,050 B2 | 8/2011 | Scheinert et al. | |
| 8,010,164 B1 | 8/2011 | Sennett et al. | |
| 8,036,822 B2 | 10/2011 | Ho et al. | |
| 8,050,690 B2 | 11/2011 | Neeraj | |
| 8,054,802 B2 | 11/2011 | Burgess et al. | |
| 8,065,185 B2 | 11/2011 | Foladare et al. | |
| 8,098,152 B2 | 1/2012 | Zhang et al. | |
| 8,121,604 B1 | 2/2012 | Schwinghammer | |
| 8,126,479 B2 | 2/2012 | Morrison | |
| 8,140,079 B2 | 3/2012 | Olson | |
| 8,193,984 B2 | 6/2012 | Ward et al. | |
| 8,194,589 B2 | 6/2012 | Wynn et al. | |
| 8,195,175 B2 | 6/2012 | Govindan et al. | |
| 8,224,349 B2 | 7/2012 | Meredith et al. | |
| 8,253,559 B2 | 8/2012 | Howard et al. | |
| 8,254,959 B2 | 8/2012 | Fix et al. | |
| 8,264,956 B2 | 9/2012 | Ramankutty et al. | |
| 8,270,933 B2 | 9/2012 | Riemer et al. | |
| 8,280,438 B2 | 10/2012 | Barbera et al. | |
| 8,295,854 B2 | 10/2012 | Osann et al. | |
| 8,300,663 B2 | 10/2012 | Chion et al. | |
| 8,307,030 B1 | 11/2012 | Hu | |
| 8,326,682 B2 | 12/2012 | Redford et al. | |
| 8,355,364 B1 | 1/2013 | Vargantwar et al. | |
| 8,355,865 B2 | 1/2013 | Wagner et al. | |
| 8,417,264 B1 | 4/2013 | Whitney et al. | |
| 8,469,274 B2 | 6/2013 | Tseng et al. | |
| 8,548,494 B2 | 10/2013 | Agarwal et al. | |
| 8,572,198 B2 | 10/2013 | Jhanji | |
| 8,594,700 B2 | 11/2013 | Nabbefeld | |
| 8,611,919 B2 | 12/2013 | Barnes | |
| 8,612,410 B2 | 12/2013 | Meredith et al. | |
| 8,666,388 B2 | 3/2014 | Catovic et al. | |
| 8,666,390 B2 | 3/2014 | Meredith et al. | |
| 8,761,799 B2 | 6/2014 | Meredith et al. | |
| 8,897,805 B2 | 11/2014 | Fix et al. | |
| 8,909,247 B2 | 12/2014 | Tipton et al. | |
| 9,008,684 B2 | 4/2015 | Tipton et al. | |
| 9,008,698 B2 | 4/2015 | Meredith et al. | |
| 2001/0047242 A1 | 11/2001 | Ohta | |
| 2002/0059266 A1 | 5/2002 | I'anson et al. | |
| 2002/0069312 A1 | 6/2002 | Jones | |
| 2002/0077116 A1 | 6/2002 | Havinis et al. | |
| 2002/0172223 A1 | 11/2002 | Stilp et al. | |
| 2003/0040323 A1 | 2/2003 | Pihl et al. | |
| 2003/0092448 A1 | 5/2003 | Forstrom et al. | |
| 2003/0095065 A1 | 5/2003 | Ericson et al. | |
| 2003/0097330 A1 | 5/2003 | Hillmer et al. | |
| 2003/0115228 A1 | 6/2003 | Horvitz et al. | |
| 2003/0115260 A1 | 6/2003 | Edge | |
| 2003/0125046 A1 | 7/2003 | Riley et al. | |
| 2003/0158924 A1 | 8/2003 | DeLegge | |
| 2003/0222819 A1 | 12/2003 | Karr et al. | |
| 2003/0225508 A9 | 12/2003 | Petzld et al. | |
| 2004/0067759 A1 | 4/2004 | Spirito et al. | |
| 2004/0082338 A1 | 4/2004 | Norrgard et al. | |
| 2004/0127191 A1 | 7/2004 | Matsunaga | |
| 2004/0131036 A1 | 7/2004 | Walsh | |
| 2004/0155814 A1 | 8/2004 | Bascobert | |
| 2004/0172190 A1 | 9/2004 | Tsunehara et al. | |
| 2004/0219930 A1 | 11/2004 | Lin | |
| 2004/0224698 A1 | 11/2004 | Yi et al. | |
| 2004/0267410 A1 | 12/2004 | Duri et al. | |
| 2004/0267561 A1 | 12/2004 | Meshkin et al. | |
| 2005/0007993 A1 | 1/2005 | Chambers et al. | |
| 2005/0039056 A1 | 2/2005 | Bagga et al. | |
| 2005/0053099 A1 | 3/2005 | Spear et al. | |
| 2005/0136911 A1 | 6/2005 | Csapo et al. | |
| 2005/0239410 A1* | 10/2005 | Rochester, III | 455/67.11 |
| 2005/0272445 A1 | 12/2005 | Zellner et al. | |
| 2005/0276385 A1 | 12/2005 | McCormick et al. | |
| 2006/0030333 A1 | 2/2006 | Ward et al. | |

(56) References Cited

U.S. PATENT DOCUMENTS

| | | |
|---|---|---|
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0240839 A1 | 10/2006 | Chen et al. |
| 2006/0240841 A1 | 10/2006 | Bhattacharya |
| 2006/0267841 A1* | 11/2006 | Lee et al. ................... 342/463 |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1* | 10/2010 | Bull et al. ................. 455/456.1 |
| 2010/0291907 A1* | 11/2010 | MacNaughtan et al. .. 455/414.1 |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1* | 8/2011 | Meredith et al. .......... 455/456.1 |
| 2011/0210843 A1 | 9/2011 | Kummetz et al. |
| 2011/0210849 A1 | 9/2011 | Howard et al. |
| 2011/0244879 A1 | 10/2011 | Siomina |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1* | 3/2012 | Austin ................. G01S 5/0063 |
| | | 455/456.6 |
| 2012/0052884 A1 | 3/2012 | Bogatin |
| 2012/0062415 A1* | 3/2012 | Hwang et al. ........... 342/357.29 |
| 2012/0087338 A1 | 4/2012 | Brandt et al. |
| 2012/0139782 A1* | 6/2012 | Gutt et al. ............... 342/357.24 |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |

(56) References Cited

U.S. PATENT DOCUMENTS

| | | |
|---|---|---|
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0137464 A1 | 5/2013 | Kramer et al. |
| 2013/0226451 A1 | 8/2013 | O'Neill et al. |
| 2013/0281111 A1 | 10/2013 | Syrjarinne et al. |
| 2013/0324149 A1 | 12/2013 | Fix et al. |
| 2013/0337824 A1 | 12/2013 | Meredith et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |

FOREIGN PATENT DOCUMENTS

| | | |
|---|---|---|
| JP | 2004069609 | 3/2004 |
| JP | 2005091303 A | 4/2005 |
| JP | 2007328050 A | 12/2007 |
| WO | 2006031035 A1 | 3/2006 |

OTHER PUBLICATIONS

G.L. Squires, Practical Physics, Cambridge University Press, p. 12, 1986.*

Represent. (2000). In Collins english dictionary. Retrieved from http://search.credoreference.com/content/entry/hcengdict/represent/0.*

Represent. (2001). In Chambers 21st century dictionary. Retrieved from http://search.credoreference.com/content/entry/chambdict/represent/0.*

Represent. (2011). In The american heritage dictionary of the english language. Retrieved from http://search.credoreference.com/content/entry/hmdictenglang/represent/0.*

CELL_DCH, in INACON Glossary, http://www.inacon.de/glossary/CELL_DCH.php, unknown.*

M. Birchler, E911 Phase 2 Location Solution Landscape. FCC Location Round Table, Wireless Access Technology Research, Motorola Labs, Jun. 28, 1999.*

Error. (2011). The American Heritage Dictionary of the English Language. Boston, MA: Houghton Mifflin. Retrieved from http://search.credoreference.com/content/entry/hmdictenglang/error/0.*

Final Office Action dated Jan. 25, 2013, for U.S. Appl. No. 13/554,285, 20 pages.

Non-Final Office Action dated Mar. 19, 2013, for U.S. Appl. No. 13/174,541, 46 pages.

Final Office Action dated Feb. 13, 2013, for U.S. Appl. No. 13/220,083, 48 pages.

Final Office Action dated Feb. 22, 2013, for U.S. Appl. No. 13/188,345, 45 pages.

Final Office Action dated Mar. 15, 2013, for U.S. Appl. No. 13/204,535, 18 pages.

Non-Final Office Action dated Mar. 19, 2013, for U.S. Appl. No. 13/284,497, 46 pages.

Non-Final Office Action dated Apr. 19, 2013, for U.S. Appl. No. 13/277,595, 58 pages.

Notice of Allowance mailed Aug. 12, 2013, for U.S. Appl. No. 13/174,541, 40 pages.

Final Office Action dated Aug. 2, 2013, for U.S. Appl. No. 13/188,295, 26 pages.

Final Office Action dated Aug. 2, 2013, for U.S. Appl. No. 13/188,300, 38 pages.

Non-Final Office Action dated Jun. 20, 2013, for U.S. Appl. No. 13/219,911, 61 pages.

Non-Final Office Action dated Jul. 17, 2013, for U.S. Appl. No. 13/188,345, 27 pages.

Non-Final Office Action dated Jun. 20, 2013, for U.S. Appl. No. 13/291,917, 52 pages.

Non-Final Office Action dated May 31, 2013, for U.S. Appl. No. 13/523,770, 40 pages.

OA dated Apr. 13, 2012 for U.S. Appl. No. 12/416,853, 36 pages.

International Search Report for PCT Application No. US2011/026122 dated Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.

"Location Based Fraud Detection", Finsphere Corporation, 2008-2010.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/sumunary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last accessed Dec. 24, 2010, 7 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

Suykens et al., "Least squares support vector machine classifiers", Neural Processing Letters, vol. 9, No. 3, Jun. 1999, pp. 293-300.

Ferris et al. (2002). "Interior-point methods for massive support vector machines". SIAM Journal on Optimization 13: 783-804. doi:10.1137/S1052623400374379.

Meyer et al. "The support vector machine under test." Neurocomputing 55(1-2): 169-186, 2003.

OA dated Oct. 2, 2012 for U.S. Appl. No. 13/554,285, 19 pages.

OA dated Aug. 30, 2012 for U.S. Appl. No. 12/958,146, 40 pages.

MobileLutions Introduces MobiLoc—A Breakthrough Technology to Control Texting in the Mobile Workplace. Press release Oct. 10, 2010 by MobileLutions. 2 pages.

(56) References Cited

OTHER PUBLICATIONS

DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/. . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. 1 page.
Hao Peng, Ban Xuegang(Jeff). Estimating Vehicle Position in a Queue at Signalized Intersections Using Simple Travel Times from Mobile Sensors. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Office Action dated Dec. 15, 2011 for U.S. Appl. No. 12/712,424, 34 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.

Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Marko Silventoinen, et al., "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; pp. 0890-8044. Retrieved May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements. 20 pages.
3GPP TS 25.331 V6.9.0 (Mar. 2006) RRC protocol for the UE-UTRAN radio interface. 1211 pages.
3GPP TS 25.413 V6.9.0 (Mar. 2006) UTRAN lu interface RANAP signalling. 330 pages.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Office Action dated Mar. 25, 2014 for U.S. Appl. No. 13/488,144, 60 Pages.
Final Office Action dated Apr. 3, 2014 for U.S. Appl. No. 13/188,295, 37 pages.
Non-Final Office Action dated Jun. 6, 2014 for U.S. Appl. No. 13/447,072, 25 pages.
Office Action dated Apr. 8, 2014 for U.S. Appl. No. 13/175,199, 52 Pages.

(56) References Cited

OTHER PUBLICATIONS

Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Non-Final Office Action dated Jun. 3, 2014 for U.S. Appl. No. 13/523,770, 53 pages.
Non-Final Office Action dated May 30, 2014 for U.S. Appl. No. 13/277,595, 49 pages.
Non-Final Office Action dated May 20, 2014 for U.S. Appl. No. 13/551,369, 29 pages.
Office Action dated Jun. 18, 2014 for U.S. Appl. No. 13/305,276, 26 Pages.
Office Action dated Jun. 26, 2014 for U.S. Appl. No. 13/557,425, 24 pages.
Non-Final Office Action dated May 30, 2014 for U.S. Appl. N No. 13/277,595, 49 pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Girardin, et al., "Digital footprinting: Uncovering tourists with user generated content." Pervasive Computing, IEEE 7.4, Oct.-Nov. 2008. 8 pages.
Stein Field, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Office Action dated Apr. 16, 2015 for U.S. Appl. No. 14/521,431, 82 Pages.
Notice of Allowance dated Mar. 19, 2015 for U.S. Appl. No. 13/494,959, 41 Pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Notice of Allowance dated Jul. 8, 2015 for U.S. Appl. No. 14/548,901, 125 pages.
Buford, et al., Location Privacy Enforcement in a Location-Based Services Platform, IEEE, 2009, 978-1-4244-2309-5/09/$25.00 © 2009 IEEE. Retrieved on Jul. 29, 2015, 5 pages.
Philips, Jr. et al., Information Sharing and Security in Dynamic Coalitions, ACM, 2002. Retrieved on Jul. 29, 2015, 10 pages.
Moniruzzaman, et al., "A Study of Privacy Policy Enforcement in Access Control Models", Proceedings of 13th International Conference on Computer and Information Technology (ICCIT 2010), © 2010 IEEE. Retrieved on Jul. 29, 2015, 6 pages.
Office Action dated Sep. 17, 2015 for U.S. Appl. No. 13/495,756, 23 Pages.
Office Action dated Sep. 14, 2015 for U.S. Appl. No. 13/557,425, 32 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 Pages.
Office Action mailed Dec. 1, 2015 for U.S. Appl. No. 13/526,988, 43 pages.
Office Action dated Jan. 11, 2016 for U.S. Appl. No. 13/175,199, 29 pages.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action mailed Nov. 30, 2015 for U.S. Appl. No. 13/447,072, 45 pages.
Office Action mailed Dec. 18, 2015 for U.S. Appl. No. 14/548,901, 35 pages.
Office Action mailed Dec. 31, 2015 for U.S. Appl. No. 14/952,609, 32 pages.
Office Action mailed Mar. 11, 2016 for U.S. Appl. No. 14/743,076, 86 pages.
Notice of Allowance mailed Mar. 16, 2016 for U.S. Appl. No. 14/520,287, 23 pages.
Office Action mailed Mar. 18, 2016 for U.S. Appl. No. 13/447,072, 37 pages.
Office Action dated May 17, 2016 for U.S. Appl. No. 15/074,622, 18 pages.
Office Action dated Apr. 13, 2016 for U.S. Appl. No. 14/877,915, 76 pages.
Office Action mailed Jun. 10, 2016 for U.S. Appl. No. 14/548,901, 33 pages.
Office Action mailed Jun. 22, 2016 for U.S. Appl. No. 14/970,533, 84 pages.

(56) References Cited

OTHER PUBLICATIONS

Office Action dated Aug. 25, 2016 for U.S. Appl. No. 13/447,072, 38 pages.
Office Action dated Aug. 24, 2016 for U.S. Appl. No. 14/676,066, 107 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.

\* cited by examiner

ESTIMATING NETWORK BASED LOCATING ERROR IN WIRELESS NETWORKS

TECHNICAL FIELD

The subject disclosure relates to wireless communications and, more particularly, to accuracy determinations of network based mobile locating methods and results thereof.

BACKGROUND

In mobile equipment networks, locating user equipments (UEs) can provide valuable additional benefits to users and opportunities for additional or improved services. Typical mobile equipment networks provide wireless access to various communications services for UEs, such as voice, video, data, messaging, content broadcast, VoIP, etc. Wireless networks types can include Universal Mobile Telecommunications System (UMTS), Long Term Evolution (LTE), High Speed Packet Access (HSPA), Code Division Multiple Access (CDMA), Time Division Multiple Access (TDMA), Frequency Division Multiple Access (FDMA), Multi-Carrier Code Division Multiple Access (MC-CDMA), Single-Carrier Code Division Multiple Access (SC-CDMA), Orthogonal frequency division multiple access (OFDMA), Single-carrier FDMA (SC-FDMA), etc.

Locating UEs in a wireless network can facilitate providing location-centric services or information in relation to the UE, such as E911 services, mapping services, or traffic information services, among many others. Additionally, UE location information can be employed to improve network performance, to troubleshoot networks, by law enforcement, to aggregate valuable demographic information, or nearly a limitless number of other uses. Such additional usage of UE location data can proactively include removal or obfuscation of identifying information at various levels to address privacy concerns.

Generally, mobile positioning methods can be divided into two major categories including UE based positioning and network based positioning. UE based technology requires the installation of client software on the UE to determine its location. This technique determines the location of the UE by computing its location by cell identification and signal strengths of the home and neighboring cells. In addition, if the UE is also equipped with GPS, then the UE can send significantly more precise location information to the network. The key disadvantages of UE based technology (from mobile operator's point of view) is the necessity of installing software on the UE, the requirement of the active cooperation of the UE subscriber, and software compatibility with the UE.

Network-based UE locating techniques utilize the service provider's network infrastructure to identify the location of the UE. The advantage of network-based techniques (from mobile operator's point of view) is that they can be implemented non-intrusively, without affecting the UE. However, the accuracy of network-based mobile locating techniques varies. For example, timing-based methods involve measuring the timing delay of the signals transmitted between the wireless base station and the UE and employing one or more algorithms to estimate the location of the UE. However, network-based UE location methods, such as timing-based location methods, lack the necessary quality measures to accompany location estimation results for the purpose of understanding the accuracy of the results.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

In an example embodiment, a method comprises receiving approximate location data based on a transmission time of a wireless signal associated with a mobile device, determining an approximate location of the mobile device based on the approximate location data, in response to an assisted global positioning system request, receiving at a substantially same time as the receiving the approximate location data, precise location data for the mobile device representing a precise location of the mobile device closer to an actual location than the approximate location, determining the precise location of the mobile device based on the precise location data, and calculating an error rate associated with the approximate location including comparing the approximate location and the precise location.

In another aspect, provided is a method comprising receiving approximate location data representative of respective approximate locations of mobile devices based on transmission times of wireless signals associated with the mobile devices, in response to assisted global positioning system requests, receiving at a substantially same time as the receiving the approximate location data, precise location data for the respective mobile devices representing precise locations of the mobile devices closer to actual locations than the approximate locations, and calculating error rates associated with the respective approximate locations including comparing the approximate locations and the precise locations for respective ones of the mobile devices.

In addition, an approximate location component configured to receive approximate location data representative of respective approximate locations of mobile devices based on transmission times of wireless signals associated with the mobile devices, a precise location component configured to receive in response to assisted global positioning system requests, precise location data for the mobile devices representing respective precise locations of the mobile devices closer to actual locations than the approximate locations, and an error component configured to compare the approximate locations and the precise locations for respective ones of mobile devices when the approximate location data and the precise location data for the respective ones of mobile devices is received at substantially the same time, and calculate error rates associated with the respective approximate locations.

The following description and the annexed drawings set forth in detail certain illustrative aspects of the disclosed subject matter. These aspects are indicative, however, of but a few of the various ways in which the principles of the subject application can be employed. The disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
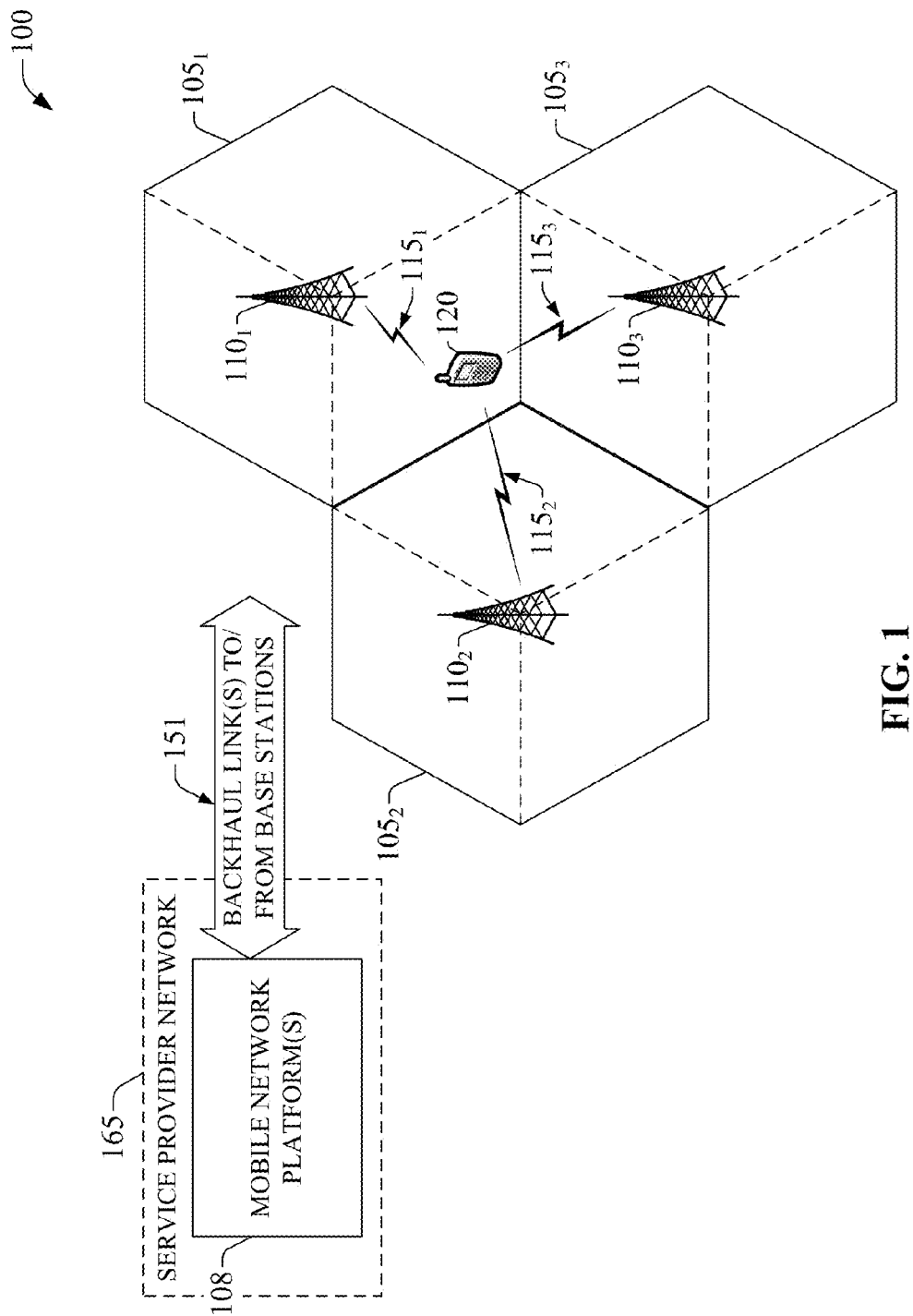
FIG. 1 illustrates a schematic exemplary wireless environment that can operate in accordance with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

The following abbreviations are relevant, at least in part, to the subject specification.

3G Third Generation
3GPP Third Generation Partnership Project
AGPS Assisted GPS
AP Access Point
BCH Broadcast Channel
CGI Cell Global Identity
CN Core Network
CS Circuit-Switched
DAS Distributed Antenna System
DCH Dedicated Transport Channel
DSL Digital Subscriber Line
E911 Enhanced 911
FACH Forward Access Channel
FL Forward Link
GGSN Gateway GPRS Service Node
GPRS General Packet Radio Service
GSM Global System for Mobile Communication
GNSS Global Navigation Satellite System
GW Gateway
ISDN Integrated Services Digital Network
UE User Equipment
IMS IP Multimedia Subsystem
IP Internet Protocol
ISP Internet Service Provider
IPTV IP Television
NBSP NodeB Site Pair
PCH Paging Channel
PCS Personal Communications Service
PS Packet-Switched
PSTN Public Switched Telephone Network
RAN Radio Access Network
RAT Radio Access Technology
RBS Radio Base Station
RL Reverse Link
RL-TDOA RL Time Difference of Arrival
RL-TOA RL Time of Arrival
RNC Radio Network Controller
RRC Radio Resource Control
RTT Round Trip Time
SGSN Serving GPRS Support Node
TA Timing Advance
UE User Equipment
U-TDOA Uplink Time Difference of Arrival
U-TOA Uplink Time of Arrival
URA UTRAN Registration Area
UTRAN Universal Terrestrial Radio Access Network To address one or more of the above noted deficiencies of conventional network based mobile locating techniques and other drawbacks of current mobile locating technologies, various systems, methods, and apparatus described employ assisted global positioning system (AGPS) based locating results as a baseline for determining error in network based locating results.

FIG. 1 is a schematic example wireless environment 100 that can operate in accordance with aspects described herein. In particular, example wireless environment 100 illustrates a set of wireless network macro cells. Three coverage macro cells $105_1$-$105_3$ comprise the illustrative wireless environment; however, it should be appreciated that wireless cellular network deployments can encompass any number of macro cells, for example, $10^4$-$10^5$ coverage macro cells. Further, any two distinct macro cells can constitute a cell-pair. For example, macros cell $105_1$ and $105_2$ can constitute a first cell-pair, and macro cells $105_1$ and $105_3$ can constitute and another cell-pair. Coverage macro cells $105_\lambda$ ($\lambda$=1,2,3) are illustrated as hexagons; however, coverage cells can adopt other geometries generally dictated by a deployment configuration or floor plan, geographic areas to be covered, and so on. Each macro cell $105_\lambda$ is sectorized in a $2\pi/3$ configuration in which each macro cells includes three sectors, demarcated with dashed lines in FIG. 1. It should be appreciated that other sectorizations are possible, and aspects or features of the disclosed subject matter can be exploited regardless of type of sectorization. Macro cells $105_1$, $105_2$, and $105_3$ are served respectively through NodeB $110_1$, $110_2$ and $110_3$. Any two NodeBs can be considered a NodeB site pair (NBSP) It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 108, and set of base stations (e.g., Node B 110$_n$, with n=1, 2, . . . ) that serve a set of macro cells; electronic circuitry or components associated with the base stations in the set of base stations; a set of respective wireless links (e.g., links 115$_k$ where k=1, 2, . . . ) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links 115$_\lambda$ embody a Uu interface (UMTS Air Interface).

Mobile network platform(s) 108 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, wireless network platform(s) 108 can control and manage base stations 110$_\lambda$, and radio component(s) associated thereof, in disparate macro cells 105$_\lambda$ by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), . . . ) In cellular wireless technologies (e.g., 3rd Generation Partnership Project (3GPP) Universal Mobile Telecommunication System (UMTS), Global System for Mobile Communication (GSM)), wireless network platform 108 is embodied in a core network and a set of radio network controllers.

In addition, wireless backhaul link(s) 151 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 151 embodies IuB interface.

It should be appreciated that while exemplary wireless environment 100 is illustrated for macro cells and macro base stations, aspects, features and advantages of the disclosed subject matter can be implemented in microcells, picocells, femto cells, or the like, wherein base stations are embodied in home-based access points.

Figure 2:
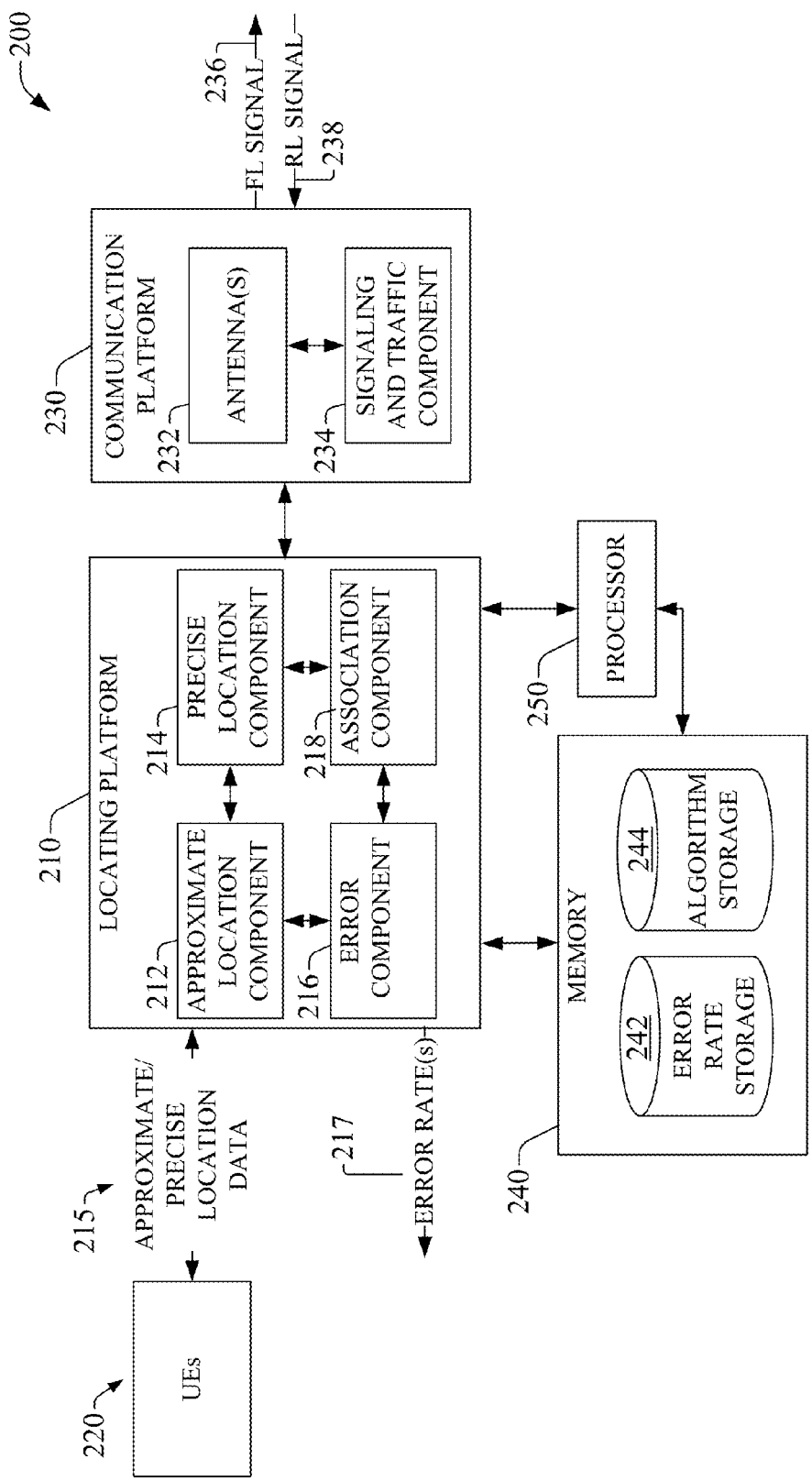
FIG. 2 is a block diagram of an exemplary system that facilitates determining the accuracy of network based UE locating methods and results thereof.

Turning now to FIG. 2, presented is a block diagram of a system 200 that facilitates determining the accuracy of network-based UE locating methods and results thereof in accordance with aspects described herein. Aspects of system 200, and systems, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described Mobile locating or positioning refers to determining the location of a mobile device (UE) in a wireless environment such as environment 100 presented in FIG. 1. In an aspect, system 200 can be a part of a mobile network, and can reside at least in part within at least one of a network management component (e.g., radio network controller RNC, core network, or network gateway), a base station, a UE, or an access point. In an aspect, the mobile network is a wideband code division multiple access (WCDMA) or UMTS network. Example system 200 includes a locating platform 210 that facilitates determining the accuracy of network-based UE locating method results at least in part by employing a granular estimation algorithm.

Locating platform 210 includes an approximate location component 212 configured to receive approximate location data of a mobile device (UE) or a stationary device that can communicate wirelessly, and employ an approximate locating method to determine the approximate location of the device. Locating platform 210 further comprises a precise location component 214 configured to receive precise location data for a mobile device such as global positioning system (GPS) determined location of the device. As used herein, a precise location of the mobile device is closer to an actual location than the approximate location. Error component 216, is configured to compare the approximate location and the GPS location of a device for a given moment in time and determine an error rate affiliated with the approximate location. Each time the error component determines an error rate, the affiliation component 218 can associate the error rate with network components employed in generating the approximate location data used to determine the approximate location for which the error rate is determined. Accordingly, when the network components having error rates affiliate therewith are subsequently employed in approximate location determinations, the accuracy of the subsequent approximate location determinations can be determined based on a totality of error rates associated with those network components employed in the subsequent approximate location determinations. In addition, the accuracy of the approximate locating method can be directly correlated with the error rates associated with individual results (i.e, the approximate location determined) of the approximate locating method.

Approximate location component 212 can employ a variety of approximate locating methods in order to determine an approximate location of a UE. Generally, mobile positioning methods can be divided into two categories including network based positioning and UE based positioning. Network-based UE locating techniques utilize the service provider's network infrastructure to identify the location of the UE. As used herein, the term approximate locating method refers to any network-based UE locating method and the term approximate location refers to the location estimate of a UE derived from a network-based UE locating method. The term approximate locating method does not include GPS or AGPS locating methods and the term approximate location does not include the results of a GPS or AGPS method.

The term approximate location as used herein indicates that a location is determined via a network based estimation technique. A precise location of the mobile device is closer to an actual location than an approximate location. The degree in which the approximate location varies from the precise location of a UE depends on the accuracy of the locating technique employed to determine the approximate location. The advantage of network based techniques (from mobile operator's point of view) is that they can be implemented non-intrusively, without affecting the UE. However, the accuracy of network-based mobile locating techniques varies. Aspects of the subject disclosure are intended to identify the accuracy of the network-based mobile locating techniques and individual results thereof.

In general, network-based mobile positioning involves determining a UE location based on wireless signal measurements associated with a UE and various network components. For example, timing-based methods involve measuring the timing delay of the signals transmitted between the wireless base station and the wireless mobile device. Other location methods involve employing radio frequency (RF) signal strength measurements between the mobile device and a network component.

Traditional time-based methods of determining UE locations include measuring the timing delay of the signals transmitted between the wireless base station and the mobile device and applying various location services or methods. Timing-based methods can include but are not limited to, cell global identity and timing advance (CGI+TA), CGI and round trip time (CGI+RTT), time of arrival (TOA). Network timing delays include site timing delay in the wireless signal path among radio component(s) at the wireless base station and a sector antenna. Network timing delays further include delays that can arise from various mismatches (e.g., impedance mismatch) among electronic elements and components, stray capacitances and inductances, length of the antenna(s) cable(s) in base station(s); tower height of base station, signal path scattering, or "signal bounces," such as multipath or strong reflections, and the like. Propagation delay between a UE and a NodeB is conventionally assumed to be negligible with respect to timing delay. However, depending on the architecture of the serving base station and covered sector antenna(s) signal propagation delay can be substantive, particularly in distributed antenna systems and low-power wireless radio cells and cause significant error in UE location determinations for traditional methods. Accordingly, additional approximate locating methods include methods that determine propagation delay with improved accuracy so as to improve UE location calculations.

Cell ID (CID) employs identifying the cell in which a mobile is located based a unique number used to identify each base transceiver station (BTS) or sector of a BTS within a location area code (LAC) if not within a GSM network. With CID errors of multiple km are expected. Enhanced CID (ECID) includes mobile timing advance and allows location of the mobile within an arc some distance from the base site, however errors can still be multiple km. Received signal strength can be employed in locating methods wherein received signal indicator (RSSI) values are and employed in propagation models. However, locating methods based on RSSI often have errors of greater than 1 km due to RSSI variation. Round Trip Time (RTT) is the length of time it takes for a signal to be sent plus the length of time it takes for an acknowledgment of that signal to be received. RTT allows multilateration from three or more base sites, however errors greater than 1 km are expected. Multilateration is a method of computing location from the time difference of arrival (TDOA) of a signal from a multiple (three or more) transmitters to a single receiver. With respect to WCDMA, the multiple transmitters are Node B's, while the single receiver is the user equipment (UE). Multilateraion can also be employed to compute location based on the RF propagation delay difference between a pair of cell sites (cell-pair).

Uplink time difference of arrival (UTDOA) uses specialized receivers on three or more base stations to measure the propagation time difference between the mobile and sites. Enhanced observed time Difference (E-OTD) is another location method that works by multilateration. Conceptually, the method is similar to U-TDOA, however, it involves time difference measurements being made in the handset rather than the network, and a mechanism to pseudo-synchronize the network. The UE makes an observation of the time difference of arrival of signals from two different base stations. These observations are known as observed time difference (OTD). The handset measures the OTD between a number of different base stations. If the base stations were synchronized, then a single OTD defines a hyperbolic locus. A second, independent OTD, for which one of the observed base stations is spatially distinct from those in the first OTD, would provide a second hyperbolic locus, and the intersection of the two loci gives an estimate of the location of the mobile. If more than two independent OTDs are available, then the measurements can be combined to yield a more accurate measurement.

In an aspect, RF fingerprinting can be employed to determine approximate locations of mobile devices. RF fingerprinting associates RF data (RSSI, WiFi) with locations and employs reverse look-up of the data to find a mobile location. Still, in yet another aspect, timed fingerprinting (TFP) can be employed to determine approximate locations of mobile devices in accordance with the subject disclosure. Timed fingerprinting is unique in that it uses observed locations from live mobiles with AGPS location technology to calibrate the base station timing of the entire UMTS network, thereby allowing all of those sites to be used in TFP the position of any UMTS mobile unit.

TFP involves three distinct stages including binning, calibration, and locating. The binning process is a non real time process that pre-computes time delay differentials and sensitivities between physical cell-pairs and fixed geographic bins. Coordinate references are used with fixed latitude and longitude offset multipliers allowing integer based x and y coordinates for simplified indexing and lookup. For example, an approximate 100 m$^2$ bin size can be employed with a fixed longitude offset of 0.0012 and a fixed latitude offset of 0.0009. Coordinate references are needed for each geographic landmass to represent. In the case of the United States, there are four landmasses to consider (Alaska, Hawaii, Puerto Rico, and the Continental US). The reference point used represents the southwestern most point to the landmass (Minimum Latitude and Minimum Longitude independently).

The calibration process of TFP is a semi real-time process that consists of multiple inter-related processes that include real-time call tracking, AGPS and timing synchronization, PSC Translation, OjiR calibration, derived calibration and calibration requests. The locating process of TFP is a real-time process that consists of multiple inter-related processes including initial locating calculations, calculation of sensitivity, sensitivity rankings and filters, calculation of least error and lastly a final approximate location result.

It should be appreciated that the approximate location component 212 can employ any of the methods described above in order to determine an approximate location of a mobile device. However, the disclosure it not limited to the methods above. Any network-based locating technique that involves exploiting relationships between a UE and a network component can be employed by the approximate location component 212 in order to determine approximate locations of mobile devices in accordance with the subject disclosure.

The locating platform 210 can receive approximate location data 215, such as timing data or signal strength data, from any network component. In an aspect, the approximate location component 212 receives approximate location data from UEs 220. In another aspect, the approximate location component 212 receives approximate location data in a radio resource control (RRC) measurement report from the UE. The purpose of the RRC measurement reporting procedure is to transfer measurement results from the UE to UTRAN (3GPP, 3GPP TS 25.331 V6.9.0 (2006-03) RRC protocol for the UE-UTRAN radio interface). RRC measurement reports may be sent by the UE periodically or by an event trigger. Periodic measurements are setup in the RNC by the operator (if the vendor equipment allows).

Various timing-based location methods utilize reported measurements from the RRC measurement report. These measurements include each individual primary scrambling code (PSC) and its associated $T_m$ measurement. The PSC represents a single radio carrier, or broadcasting cell. For each PSC, a $T_m$ measurement is reported. Pairs of $T_m$ measurements, between two distinct cells (a cell-pair), can be calculated to represent the (OTD) between the two cells.

According to an embodiment, locating platform 210 can request information (e.g., timing data, location data from a location enabled UE, etc.) from UEs through a FL wireless signal 236 that is conveyed by a signaling and traffic component 234 in a communication platform 230, which can be a part of a serving access point or NodeB. Locating platform 210 can access the requested information for UEs on a RL wireless signal 238, in the RL counterpart transport channel. It should be appreciated that communication platform 230 includes antenna(s) 232. It is noted that such returned timing data is typically part of basic, conventional UE RAN operation, and no additional equipment is necessary to generate such data in most cases. Where such equipment is needed, it can be included and should be considered within the scope of the presently disclosed subject matter.

As noted supra, approximate location component 212 employs an approximate locating method to determine the approximate location of a mobile device. For example, approximate locating methods can include but are not limited to CGI+TA CGI+RTT, TOA, CID, ECID, RSSI, RTT, UTDOA, EOTD, Multilateration, RF Fingerprinting, and Timed Fingerprinting. In an aspect, the approximate locating method employed involves implementing various algorithms, stored in algorithm storage 244, to characterize or evaluate various features of received approximate location data 215. In an aspect, algorithms employed by the approximate location component 212 include statistical analysis methodologies; other analysis methodologies such as spectral analysis and time-series analysis also can be utilized. Approximate locating data 215 and determined approximate locations can be cached in location/error storage 242. Location/error storage 242 can be communicatively coupled to other data storage locations (not illustrated), either locally or remotely, to facilitate sharing of information stored therein.

Precise location component 214, is configured to receive precise location data for a mobile device and determine the precise location of the mobile device based on the precise location data. As used herein, the term precise location data includes data related to a location of a mobile device received in response to an assisted global positioning system (AGPS) request. AGPS uses network resources to locate and utilize GPS satellites resulting in improved startup performance, or time-to-first-fix (TTFF) of a GPS satellite-based positioning system. AGPS acquires and stores information about the location of satellites via the cellular network (see almanac) so the information does not need to be downloaded via satellite. In addition, AGPS helps position a phone or mobile device when GPS signals are weak or not available. For example, GPS satellite signals may be impeded by tall buildings, and do not penetrate building interiors well. AGPS uses proximity to cellular towers to calculate position when GPS signals are not available.

In an aspect, precise location component 214 receives AGPS data in a radio access network application part (RANAP) report. The purpose of a RANAP location report procedure is to provide the UE's location information to the locating platform. The RANAP procedure uses connection oriented signaling (3GPP, 3GPP TS 25.413 V6.9.0 (2006-03) UTRAN Iu interface RANAP signaling). The precise location information contained in a RANAP report includes data related to an AGPS request. For example, the precise location information can include GPS coordinates of a mobile device. In another aspect, the precise location information report can include additional information such as the proximity of a device to cellular towers. Therefore, in an aspect, in order to determine the precise location of a mobile device, the precise location component 214 merely employs the GPS determined coordinates of the device. In another aspect, in order to determine the precise location of a mobile device, the precise location component 214 calculates a position of the mobile device based on additional AGPS information gathered about the location of the device in the RANAP report. Still in yet another aspect, the AGPS determined location information in a RANAP report is the precise location of the mobile device. For example, the AGPS results as embodied in the RANAP report can be the product of analysis at another network component or requesting platform.

AGPS based location requests may be triggered by a location based services (LBS) platform, or another requesting platform. For example, the AGPS request can originate from a device in conjunction with an E911 request. In another example, an application employed by a device such a as social networking application, may require the device enable an AGPS request prior to providing service. In another example, requesting platform associated with the network can issue periodic AGPS requests. When a control plane based request is made, the GMLC sends the request to the radio network controller (RNC) where the mobile device (UE) is currently active.

Locating platform 210 further includes error component 216. Error component 216, is configured to detect an event when approximate location data and precise location data associated with a mobile device are received at substantially the same time, including the exact same time. In an aspect the receiving the approximate/precise location data 215 occurs in real-time or near-real time with respect to the time when the approximate/precise data is generated. When both the approximate location data and the precise location data are received at the same time for a given device, the device will have remained in the same location at the time in which the data is received. Accordingly, the error component 216 can then calculate an error rate associated with the approximate location of the mobile device as determined by the approximate location component 212 based on a comparison between the approximate location and the precise location of the mobile device. In particular, periodically AGPS location based requests can occur. For example, as described above, an AGPS request can originate from the device, a LBS platform, or another requesting platform. When an AGPS request occurs, precise location component 214 detects the request, and receives at least GPS information of the mobile device involved in the request. The error component 216 can then correlate the precise location data, such as GPS data, for the mobile device with an approximate location data of the device received at the same time. This is possible because when the network responds to an AGPS request, the time at which the GPS location of the mobile is determined and received is known. Further, the time at which approximate location data is determined is known. Accordingly, the error component can correlate the GPS data to approximate location data received at the same time for a particular device. When this coincidence occurs, the error component 216 can calculate an error rate in meters, between the precise location and the approximate location determined via an approximate locating method.

In an aspect, in order to correlate an AGPS result to an approximate locating method result, the UE is into an active CELL-DCH state. When in an active CELL-DCH state, the UE will report periodic and event based RRC measurement reports containing timing-based information as described supra. The UE provides the precise location component 214 the result of the AGPS locate request through a RANAP location report. The RRC measurement report and the RANAP location report can be synchronized in time, to create a match for error estimation purposes.

It should be appreciated that based upon specific aspects of the UEs 220, the locating platform can receive approximate location data and/or precise location data (i.e. GPS data) 215, (including as via an RRC measurement report or a RANAP report), over an air-interface by way of communication platform 230, or through a network management component such as a network server, a radio network controller, or a network gateway. Thus, the locating platform 210 can receive approximate location data and/or precise location 215 data from a UE directly or from a network component. UEs 220 can provide approximate location data and precise location data at least in part, on GNSS, such as AGPS, and network planning information. In an aspect, the UEs 220 comprise a set of mobile devices that, at least in part, support GNSS data reception and manipulation thereof. For example, these UEs can communicate with a GNSS system (e.g., GPS, Galileo, GLONASS . . . ) through a deep-space link. These UEs can receive timing signaling that allows determination, at least in part, of an approximate position of each UE by the location component.

Locating component 210 can further include association component 218. Association component 218, is configured to associate an error rate with one or more network components responsible for the approximate location data used to determine the approximate location for which the error rate is calculated. Association component 218 can store information for each network component and the error rates associated therewith, in the error rate storage unit 242. For example, as discussed infra, the association component can associate an error rate to cell-pair from which OTD data is collected to facilitate determining the approximate location of a UE. Each time a network component is involved in an approximate location determination and an error rate is calculated by the error component for the approximate location, the error rate can be associated with that network component and stored in error storage 242. Therefore, each network component can accumulate an error rate history comprising multiple error rates associated therewith whenever the network component is employed to generate approximate location information for a device and AGPS information is received simultaneously. Where several network components are located in a defined area and a large population of mobile devices are used in the area, the network components will eventually have several error rates associated therewith. Accordingly, the network components in a defined area can become calibrated in accordance with the network based UE locating method employed in approximate location determinations.

In another aspect, the error component 216 can employ the error rate history of any given network component in order to determine a median rate for each component. Median error rate determinations can account for eventual shifts in error as calibration improves. The error component 216 can use the median error rate calculated for each network component to determine an error rate for subsequent approximate location determinations, regardless as to whether precise location data is received concurrently with approximate location data. As used herein, the term mean error rate is understood as the error rate calculated for an approximate location based on the error rates of contributing network components. Mean error rate is not the same as an error rate calculated by a comparison between a concurrently determined AGPS location and approximate location.

In an aspect, each time an error rate or a mean error rate is calculated, it can be stored in memory 240, such as in error rate storage. The stored error rates and mean error rates can later be retrieved by the locating platform 210 or an external platform, for future analysis. In addition, each time an error rate or mean error rate is calculated, it can be relayed via communication platform 230 to an external system for storage or analysis. According to this aspect, the error component 216 can merely determine an error rate for a subsequently determined approximate location computed as the mean error rate from all contributing network components. In particular, each time multiple network components having median error rates associated therewith contribute to the approximate location data used to determine an approximate location of a UE, the error component 216 can calculate an error rate for the approximate location calculated as the mean error rate from the multiple network components. Accordingly, the accuracy of any approximate location determination can be calculated so long as at least one of the network components involved in the approximate location determination has an error rate associated therewith. It should be appreciated that as more and more error rates are associated with more and more network components over time, mean error rates calculated for a subsequent approximate location determination will become more reliable.

Over time, approximate location errors may improve depending on the locating method employed. For example, with respect to time-based methods, error rates may improve depending on the methods used for calibrating timing synchronization. Thus in order to ensure that the median error rate for each network component is representative of a current accuracy level for the approximate locating method, historical error rate outliers can be removed by the association component 218. The association component 218 can employ any type of method to determine outlier error rates. In an aspect, when employing the median error rate, the association component 218 can merely eliminate the error rates that repeatedly remain the sample maximum or minimum over a pre-determined time period. In another aspect, the association component 218 can employ model-based methods, which assume that the data collected is from a normal distribution, and identify observations that are deemed "unlikely" based on mean and standard deviation, including Chauvenet's criterion, Grubbs' test for outliers, or Peirce's criterion.

With system 200, not only can error rates be determined for instances where AGPS data is received at the same time as approximate location data, but further, when approximate location data is received alone. Accordingly, whenever an approximate location is determined via any network based locating method, the accuracy of the approximate location determination can be determined. Error rate determinations provide an active means to assess internally, result accuracy of network based mobile locating methods. Accordingly, the network can determine when the accuracy of a network based locating method has degraded for a specific area. In addition, by knowing the accuracy of an approximate location determination, external systems can filter results that do not meet their application needs. For example, RF engineering systems rely heavily on accuracy of geo-coded signal measurements. Determining when to re-orient an antenna system based on geo-coded signal measurements can be detrimental to performance when the intended area of concern is off by several hundred meters. These RF Engineering design applications will return much more robust solutions when able to filter out results outside a threshold.

As discussed infra, in an aspect, approximate location component 212 can employ time-based location methods to determine an approximate location of a mobile device. Timing of wireless signals must take into consideration the time from wave signal generation or output at radio equipment a transmitter (e.g., a UE or NodeB) to detection at a receiver (e.g., a UE or NodeB). Such timing includes site timing through link(s) to antenna(s) and propagation time over the air interface or wireless channel. Timing delay typically is caused by various source, e.g., mismatches among electronic elements and components (e.g., impedance mismatch), stray capacitances and inductances, length of the antenna(s) cable(s) in base station(s); tower height of base station, whereas timing delay spread generally originates from any signal path scattering, or "signal bounces," such as multipath, strong reflections, etc.; and the like.

In general, timing based methods involve determining observed time difference values ('C'), propagation timing values ('B'), and site timing values ('A') among forward link (FL) and reverse link (RL) wireless signals, e.g., signaling or traffic, delivered and received, respectively, by a base station or access point. In an aspect, time-based locating methods employ multiple cell-pair OTD measurements to determine an approximate location of a mobile device. For example, a UE observed time difference (OTD), 'C', includes both a cell site timing portion, 'A', and a RF propagation portion, 'B', such that A+B=C. Further, where cell site location and UE location are known, the RF propagation time, B, can be deduced, e.g., B=(distance between UE and cell site/speed of light). Using the deduced RF propagation time, B, and UE OTD, C, the cell site timing, A, can be calculated, as A=C−B. Site timing, A, is relatively stable over periods of hours to days for most modern network equipment. Once A is determined, C can be measured for additional UEs and the RF propagation time (i.e., B) for theses additional UEs can be determined by B=C−A. RF propagation time, B, can then be converted into a distance (e.g. , B*speed of light=distance) and, using multilateration techniques and timed fingerprinting (TFL) techniques, UEs approximate locations can be determined. It should be appreciated that additional time-based location techniques that use OTD measurements can be employed to determine approximate locations of mobile devices in accordance with the subject disclosure.

Figure 3:
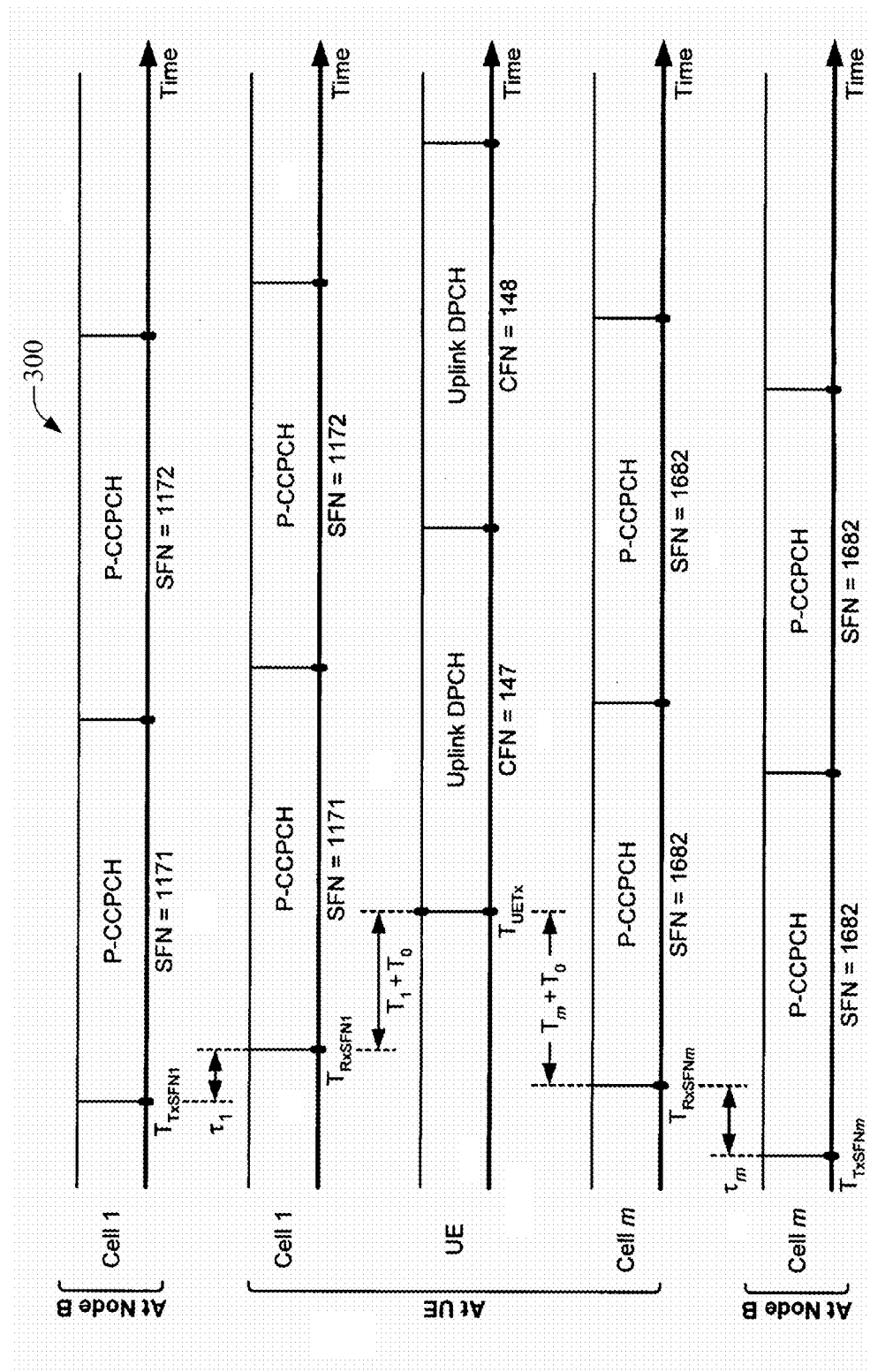
FIG. 3 shows an example of the timing of a UE and a cell-pair, cell 1 and cell m, in a wireless environment.

FIG. 3 shows an example of the timing of a UE and a cell-pair, cell 1 and cell m, in a wireless environment such as example environment 100 depicted in FIG. 1. In DMTS, the transmission timeline of each cell is partitioned into frames, with each frame having a duration of approximately 10 milliseconds (ms) and covering 38,400 chips. Each frame is identified by a 12-bit system frame number (SFN). The SFN is incremented by one for each frame, ranges from 0 to 4095, and wraps around to 0 after reaching 4095. The SFN is sent every 20 ms on a Primary Common Control Physical Channel (P-CCPCH). In DMTS, the cells may operate asynchronously. In this case, the frames of different cells may not be time-aligned and may also have different frame numbering, as shown in FIG. 3.

The transmission timeline of the UE is also partitioned into frames, with each frame being identified by an 8-bit connection frame number (CFN). The CFN is initialized based on the SFN of a serving cell when a Dedicated Physical Channel (DPCH) is established for the UE. The CFN is maintained by the UE and the RNC and is not sent over the air.

The UE may determine an SFN-CFN observed time difference (OTD) for a given cell m, as follows:

$$OTD_m = OFF_m \cdot 38{,}400 + T_m, \quad\quad Eq~(1)$$

where OTDm is the OTD for cell m,
OFFm is a frame-level portion of the OTD for cell m, and
$T_m$ is a chip-level portion of the OTD for cell m.

The OTDm is the difference between the timing of cell m and the timing of the DE, as observed by the DE and given in units of chip. The chip-level portion of the OTD may be given as:

$$T_m = (T_{UETx} - T_o) - T_{RxSFNm}, \quad\quad Eq~(2)$$

where $T_{UETx}$ is the start of an uplink DPCH frame for the DE,
$T_o$ is a constant defined to be equal to 1024 chips, and
$T_{RxSFNm}$ is the start of a P-CCPCH frame for cell m before time instant $T_{UETx} - T_o$ as observed at the UE.

Time instant $T_{UETx} - T_o$ is the start of a downlink DPCH frame for the serving cell. The start of the uplink DPCH frame for the UE is set $T_o$ chips after the start of the downlink DPCH frame, as measured at the UE. Time instant $T_{UETx}$ is used as a time reference to measure $T_m$ for each cell to be reported.

The frame-level portion of the OTD may be given as:

$$OFF_m = (SFN_m - CFN_{Tx}) \bmod 256, \quad\quad Eq~(3)$$

where $CFN_{Tx}$ is the CFN of the uplink DPCH frame starting at time $T_{UETx}$, and $SFN_m$ is the SFN of the P-CCPCH frame for cell m starting at time $T_{RxSFNm}$.

As shown in FIG. 3, the UE receives the P-CCPCH frame for cell m after a delay of $T_m$, which is the propagation delay from cell m to the UE. The P-CCPCH frame is transmitted by cell m at time instant $T_{TxSFNm}$ and is received by the UE at time instant $T_{RxSFNm}$ where $T_m = T_{TxSFNm} - T_{RxSFNm}$.

The UE may make OTD measurements for any number of cell-pairs. As discussed infra, the UE may send may send the OTD measurements in an RRC report to locating platform 210 by way of communication platform 230, or through a network management component such as a network server, a radio network controller, or a network gateway by way of communication platform 230, or through a network management component such as a network server, a radio network controller, or a network gateway.

Figure 4:
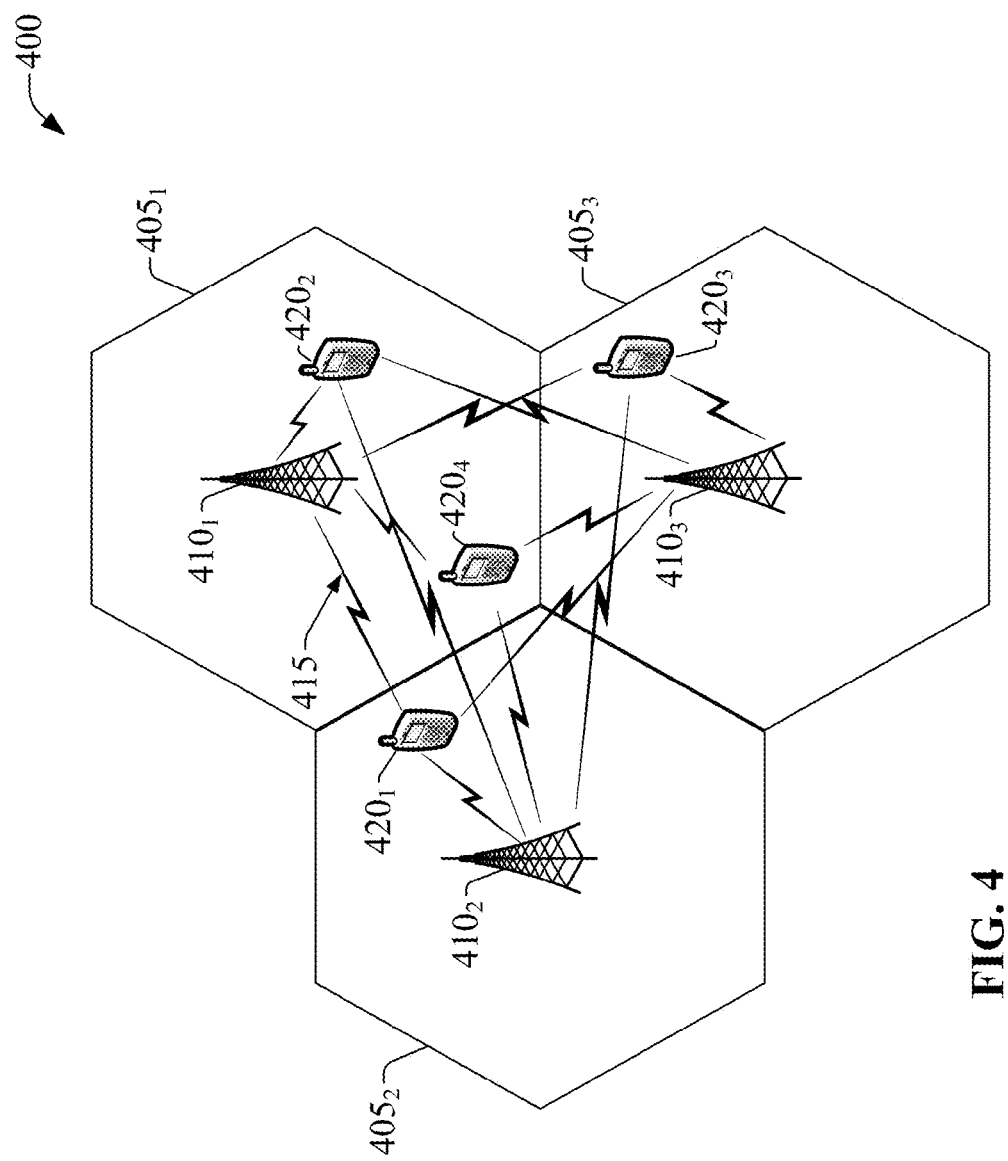
FIG. 4 illustrates a schematic exemplary wireless environment that can operate in accordance with aspects of the disclosed subject matter.

Referring now to FIG. 4, aspects of system 200 will now be exemplified where a time-based locating method is employed to determine approximate locations of a UE. FIG. 4 is a schematic example wireless environment 400 that can operate in accordance with aspects described herein. In particular, example wireless environment 400 illustrates a group of wireless network cells. Three coverage cells $405_1$-$405_3$ comprise the illustrative wireless environment; however, it should be appreciated that wireless cellular network deployments can encompass any number of cells, for example, $10^4$-$10^5$ coverage cells. Further, any two distinct cells can constitute a cell-pair. For example, cells $405_1$ and $405_2$ can constitute a cell-pair, cells $405_1$ and $405_3$ can constitute and another cell-pair, and cells $405_2$ and $405_3$ can constitute a cell pair. Cells $405_1$-$405_3$ are served respectively through NodeB $410_1$-$410_3$. Any two NodeBs can be considered a NodeB site pair (NBSP). Four UEs $420_1$-$420_4$. Each of the UEs send and receive wireless signals 415 between various NodeBs.

As described infra, certain time based locating methods, such as multilateration and timed fingerprinting, employ OTD measurements. According to these methods, multiple OTD measurements provide contribution to approximate location determinations. Each cell-pair OTD measurement has unknown error that will contribute to an approximate location result. With respect to FIG. 4, in an aspect, approximate location component can receive first OTD measurements related to UE $420_1$ for the three cell pairs, $405_1/405_2$, $405_1/405_3$ and $405_2/405_3$ via an RRC report. The approximate location component then employs the first OTD measurements to determine an approximate location for UE $420_1$. At substantially the same time, the precise location component 214 receives the GPS location for UE $420_1$ via AGPS data in a RANAP report. For example, the RRC report and the RANAP reports for UE $420_1$ can be received in real-time or near real-time, as the generation of the OTD measurements and the GPS determination respectively for UE $420_1$. The error component can then determine an error rate for the approximate location of UE $420_1$ by comparing the approximate location determination with the actual GPS location for UE $420_1$. Once the error rate is determined the association component 218 can the associate the error rate with each of the three cell pairs, $405_1/405_2$, $405_1/405_3$ and $405_2/405_3$.

The approximate location component can also receive second OTD measurements related to UE $420_2$ for the three cell pairs, $405_1/405_2$, $405_1/405_3$ and $405_2/405_3$ via an RRC report. The approximate location component then employs the second OTD measurements to determine an approximate location for UE $420_2$. At substantially the same time, the precise location component 214 receives the GPS location for UE $420_2$ via AGPS data in a RANAP report. For example, the RRC report and the RANAP reports for UE $420_2$ can be received in real-time or near real-time, as the generation of the OTD measurements and the GPS determination respectively for UE $420_2$. The error component can then determine an error rate for the approximate location of UE $420_2$ by comparing the approximate location determination with the actual GPS location for UE $420_2$. Once the error rate is determined the association component 218 can then associate the error rate with each of the three cell pairs, $405_1/405_2$, $405_1/405_3$ and $405_2/405_3$. At this point, each of the three cell-pairs have two error rates associated therewith.

The approximate location component can also receive third OTD measurements related to UE $420_3$ for the three cell pairs $405_1/405_2$, $405_1/405_3$ and $405_2/405_3$ via an RRC report. The approximate location component then employs the third OTD measurements to determine an approximate location for UE $420_3$. At substantially the same time, the precise location component 214 receives the GPS location for UE $420_3$ via AGPS data in a RANAP report. For example, the RRC report and the RANAP reports for UE $420_3$ can be received in real-time or near real-time, as the generation of the OTD measurements and the GPS determination respectively for UE $420_3$. The error component can then determine an error rate for the approximate location of UE $420_3$ by comparing the approximate location determination with the actual GPS location for UE $420_3$. Once the error rate is determined the association component 218 can the associate the error rate with each of the three cell-pairs, $405_1/405_2$, $405_1/405_3$ and $405_2/405_3$.

At this point, each of the three cell-pairs $405_1/405_2$, $405_1/405_3$ and $405_2/405_3$, have three error rates associated therewith. The error component can then can then determine a median error rate for each of the three cell pairs $405_1/405_2$, $405_1/405_3$ and $405_2/405_3$. With respect to this example, the median error rate for each of the three cell pairs $405_1/405_2$, $405_1/405_3$ and $405_2/405_3$ will be the same because the approximate location determinations for UEs $420_3$-$420_3$ involved the same cell pairs. However, it should be appreciated that a plurality of cell pairs can be involved in UE approximate location determinations. For example, OTD measurements can be employed from two cell pairs, five cell pairs, ten cell pairs, etc. In addition, a cell-pair does not require that two cells are adjacent to one another. Accordingly, multiple cell pairs can have several different error rates associated therewith.

The approximate location component can then receive fourth OTD measurements related to UE $420_4$ for the three cell pairs $405_1/405_2$, $405_1/405_3$ and $405_2/405_3$ via an RRC report. The approximate location component then employs the fourth OTD measurements to determine an approximate location for UE $420_3$. However, no AGPS data is received for UE $420_4$. Nevertheless, the error component 216 can determine a mean error rate for the approximate location of UE $420_4$ by calculating a mean error rate from the median error rates of each of the three cell pairs $405_1/405_2$, $405_1/405_3$ contributing to the fourth OTD measurements. The error component can then attribute the mean error rate to the approximate location of UE $420_4$.

In addition, although FIG. 4 describes collecting error rates for different mobile devices, $420_1$-$420_3$, it should be appreciated that multiple error rates can be determined for the same device at different locations. For example, the procedure described above with respect to a device such as device $420_1$, can be repeated when the device $420_1$ is at a different location at a different time. Further, although FIG. 4 describes collecting error rates for three different mobile devices, it should be appreciated that error rates can be collected for any number of UEs. For example, depending on the area, approximate locations of hundreds of thousands to hundreds of millions of UEs can be determined, as well as error rates associated therewith when AGPS data is received concurrently with approximate location data for any one of the devices. Accordingly, multiple cell-pairs for a given area can become calibrated hundreds, thousands or millions of error rates over time.

Various aspects of the disclosed subject matter can be automated through artificial intelligence (AI) methods to infer (e.g., reason and draw a conclusion based upon a set of metrics, arguments, or known outcomes in controlled scenarios) suitable models for propagation of wireless signal, e.g., RF signal, microwave signal, etc.; optimal or near-optimal positions for probes that enable generation of accurate location estimates; or the like. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

Figure 5:
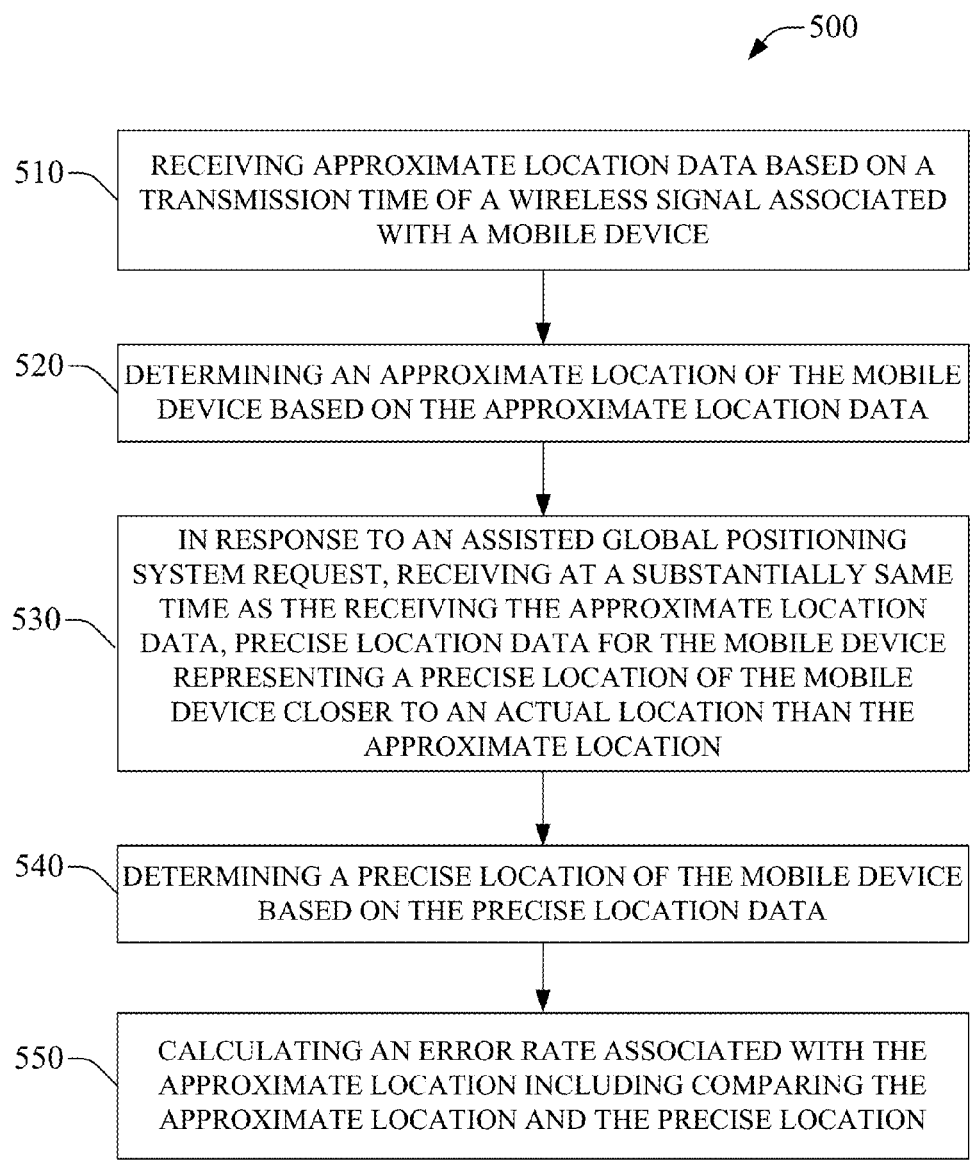
FIG. 5 presents a flowchart of an exemplary method 500 for determining an error rate associated with an approximate location of a UE with AGPS data.
Figure 6:
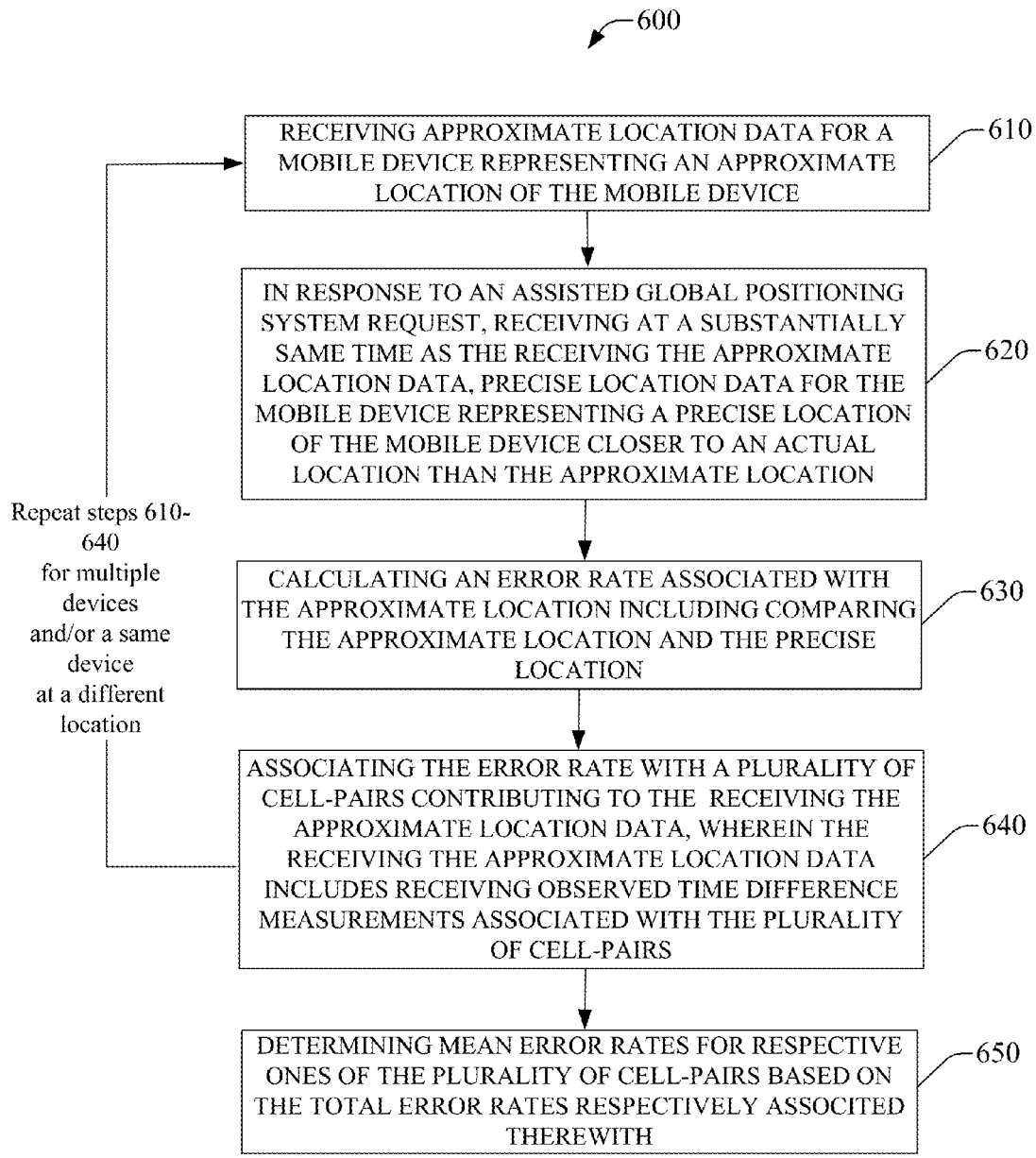
FIG. 6 presents a flowchart of an exemplary method 600 for determining an error rate associated with an approximate location of a UE with AGPS data.
Figure 7:
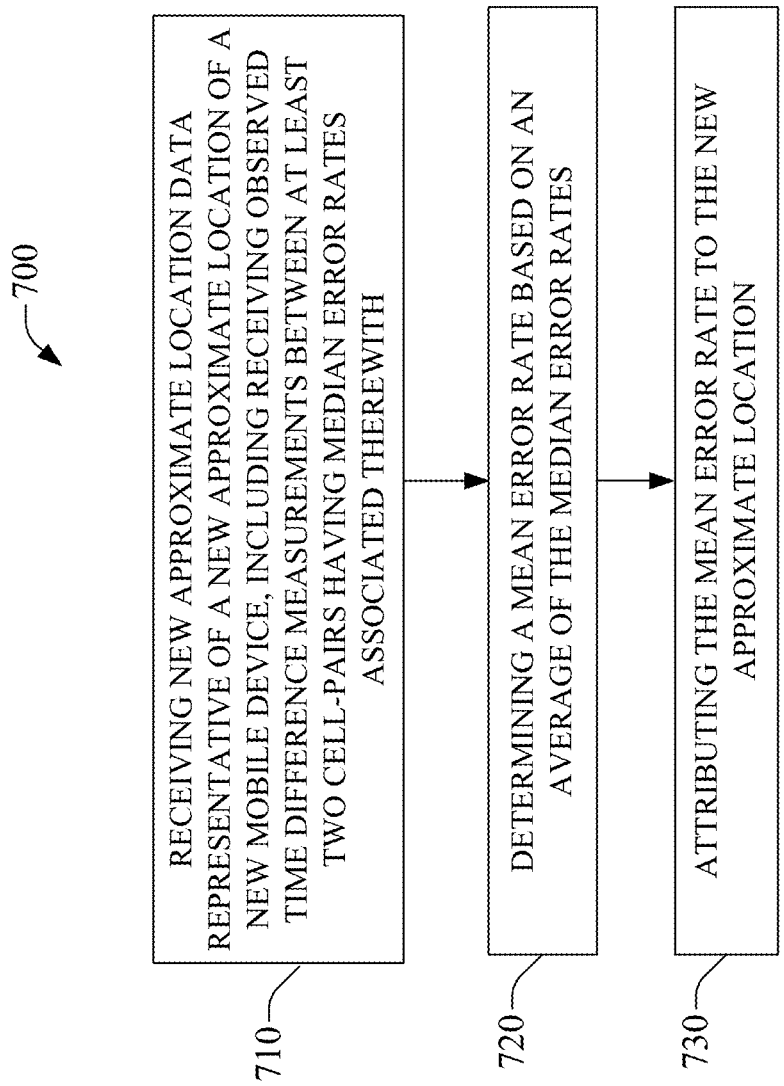
FIG. 7 presents a flowchart of an exemplary method 700 for determining an error rate associated with an approximate location of a UE without AGPS data.

In view of the example system(s) described above, example method(s) that can be implemented in accordance with the disclosed subject matter can be better appreciated with reference to flowcharts in FIGS. 5-7. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

FIG. 5 presents a flowchart of an example method 500 for determining an error rate associated with an approximate location of a UE. The error rate information can be leveraged to facilitate location-centric services when determining when to deliver services and/or products. The subject example method 500, while illustrated for RF signal, also can be employed with regard to electromagnetic radiation (EM) with frequencies other than radio frequency, for instance, microwave EM radiation, infrared radiation, etc. In an aspect, the subject example method 600 can be implemented by one or more network components, e.g., locating platform 210. Alternatively or additionally, a processor (e.g., processor 250) configured to confer, and that confers, at least in part, functionality to the one or more network components can enact the subject example method 500.

At 510, approximate location based on a transmission time of a wireless signal associated with a mobile device is received. In an aspect, the approximate location data includes OTD measurements from at least two cell-pairs.

Further, although step 510 indicates a time-based locating method is employed, it should be appreciated that an RF signal strength method, such as RF fingerprinting, can be employed. Where an RF signal strength method is employed, at step 510, the location data can be related to a strength of a wireless signal associated with a mobile device instead of a timing of a wireless signal associated with a mobile device. Once approximate location data is received, at 520, an approximate location of the mobile device is determined.

Continuing to step 530, precise location of the mobile device is then received at substantially the same time as the approximated location data and in response to an AGPS request. For example, any precise location information can be received that is associated with an AGPS request such as GPS information included in a RANAP report. The precise location data represents a location of the mobile device closer to an actual location than the approximate location. Once the precise location data is received, a precise location of the mobile device is determined at 540. Then at 550, an error rate is calculated that is associated with the approximate location based on a comparison between the approximate location and the precise location.

FIG. 6 is a flowchart of another exemplary method 600 for determining the accuracy of time-based approximate location determinations of a UE in a wireless network according to aspects of the disclosed subject matter. The subject example method 600 can be implemented by one or more network components, e.g., locating platform 210. Alternatively or additionally, a processor (e.g., processor 250) configured to confer, and that confers, at least in part, functionality to the one or more network components can enact the subject example method 600.

At 610, approximate location data for a mobile representing an approximate location of the mobile device, is received. For example, the approximate location data can include OCD measurements between at least two cell-pairs. Continuing to step 620, precise location of the mobile device is then received at substantially the same time as the approximated location data and in response to an AGPS request. For example, any precise location information can be received that is associated with an AGPS request such as GPS information included in a RANAP report. The precise location data represents a location of the mobile device closer to an actual location than the approximate location. Then at 630, an error rate is calculated that is associated with the approximate location based on a comparison between the approximate location and the precise location. At 640, the error rate is associated with a plurality of cell-pairs contributing to the receiving the approximate location data wherein the receiving the approximate location data includes receiving OTD measurements associated with the plurality of cell-pairs.

Steps, 610 through 640 are then repeated several times for multiple devices or a same device at a different location. For example, steps 610 through 660 can be repeated twice or hundreds, thousands, or millions of times resulting in an error rate determination each time. It should be appreciated that each error rate determination is attributed to at least two-cell pairs contributing to the approximate location data employed in the approximate location determination associated therewith. For example, assume a given area has cell sites A-D. For a first device, cell-pairs A-B and A-C can contribute to the approximate location determination. For second device, cell-pairs A-D and B-D can contribute to the approximate location determination. For a third device, cell-pairs B-C and D-D can contribute to the approximation, and so on. Accordingly, when process 600 is repeated several times, eventually all possible combinations of cell-pairs A-B, A-C, A-D, B-C, B-D, and C-D can have several error rates associated therewith. It should be appreciated that for simplicity, only four cell-sites, (and thus six combinations of cell-pairs) are mentioned as an example. However, process 600 can be employed with any number of cell-pairs.

At step 650, median error rates for respective ones of the plurality of cell-pairs are determined based on the total error rates respectively associated therewith. For example, when a cell-pair has more than one error rate associated therewith, a median error-rate can be determined for the cell-pair. It should be appreciated that as the number of error rates associated with a cell-pair increases, the median error rate can be dynamically determined based on all error rates associated therewith at a given moment in time.

FIG. 7 presents a continuation of process 600. Process 700 represents a resulting process for determining accuracy of network based locating methods following implementation of process 600. For example, process 700 is performed after cell-pairs have median error rates already attributed thereto. Accordingly, process 700 enables determining the accuracy of a network based locating method or result thereof, even when no AGPS data is received. Looking at FIG. 700, at 710, new approximate location data representative of a new approximate location of a new mobile device is received. The new approximate location data includes OTD measurements between at least two cell-pairs having median error rates associated therewith. It should be appreciated that although step 710 indicates a new device is involved, any device can be involved. For example, the device can include any device for which an error rate was previously determined for a previous approximate location of the device based on previous AGPS data received. At step 720, a mean error rate is calculated based on an average of the median error rates. Lastly, at step 730, the mean error rate is attributed to the new approximate location of the mobile device.

Figure 8:
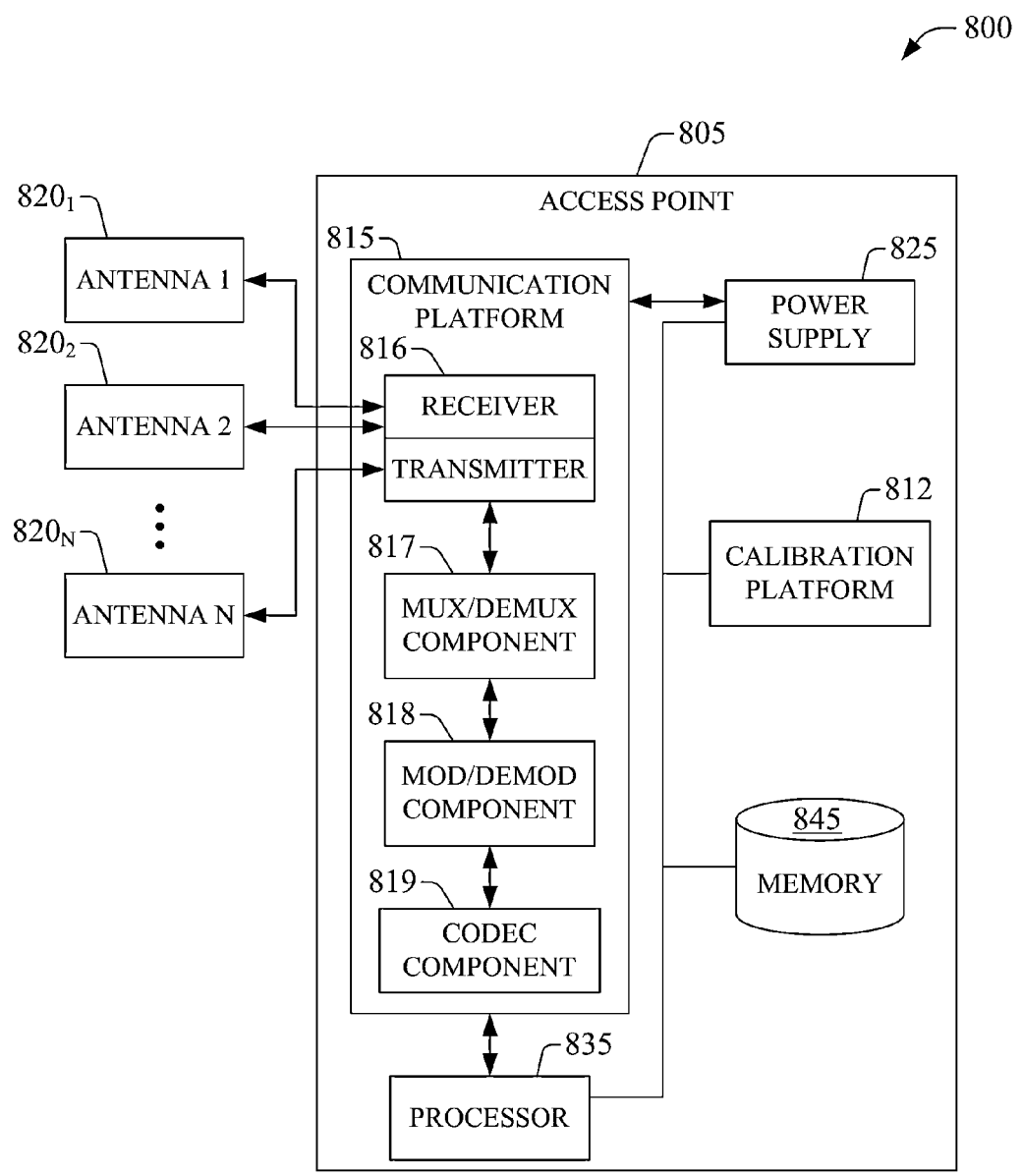
FIG. 8 illustrates a block diagram of an exemplary embodiment of an access point to implement and exploit one or more features or aspects of the disclosed subject matter.

FIG. 8 illustrates a block diagram of an example embodiment of an access point to implement and exploit one or more features or aspects of the disclosed subject matter. In embodiment 800, AP 805 can receive and transmit signal(s) (e.g., attachment signaling) from and to wireless devices like femto access points, access terminals, wireless ports and routers, or the like, through a set of antennas $820_1$-$820_N$ (N is a positive integer). It should be appreciated that antennas $820_1$-$820_N$ embody antenna(s) 232, and are a part of communication platform 815, which comprises electronic components and associated circuitry that provides for processing and manipulation of received signal(s) and signal(s) to be transmitted. Such electronic components and circuitry embody at least in part signaling and traffic component 234; communication platform 815 operates in substantially the same manner as communication platform 230 described hereinbefore. In an aspect, communication platform 815 includes a receiver/transmitter 816 that can convert signal (e.g., RL signal 238) from analog to digital upon reception, and from digital to analog upon transmission. In addition, receiver/transmitter 816 can divide a single data stream into multiple, parallel data streams, or perform the reciprocal operation. Coupled to receiver/transmitter 816 is a multiplexer/demultiplexer 818 that facilitates manipulation of signal in time and frequency space. Electronic component 818 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 818 can scramble and spread information (e.g., codes) according to substantially any code known in the art; e.g., Hadamard-Walsh codes, Baker codes, Kasami codes, polyphase codes, and so on. A modulator/demodulator 818 is also a part of communication platform 815, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 815 also includes a coder/decoder (codec) component 818 that facilitates decoding received signal(s), and coding signal(s) to convey.

Access point 805 also includes a processor 835 configured to confer functionality, at least in part, to substantially any electronic component in AP 805. In particular, processor 835 can facilitate determination of propagation delay information of RF signal, or microwave signal, among communication platform 815 and antennas $820_1$-$820_N$ in accordance with various aspects and embodiments disclosed herein. Power supply 825 can attach to a power grid and include one or more transformers to achieve power level that can operate AP 805 components and circuitry. Additionally, power supply 825 can include a rechargeable power component to ensure operation when AP 805 is disconnected from the power grid, or in instances, the power grid is not operating.

Processor 835 also is functionally connected to communication platform 815 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 835 is functionally connected, via a data or system bus, to calibration platform 812 and other components (not shown) to confer, at least in part functionality to each of such components.

In AP 805, memory 845 can store data structures, code instructions and program modules, system or device information, code sequences for scrambling, spreading and pilot transmission, location intelligence storage, determined delay offset(s), over-the-air propagation models, and so on. Processor 835 is coupled to the memory 845 in order to store and retrieve information necessary to operate and/or confer functionality to communication platform 815, calibration platform 812, and other components (not shown) of access point 805.

Figure 9:
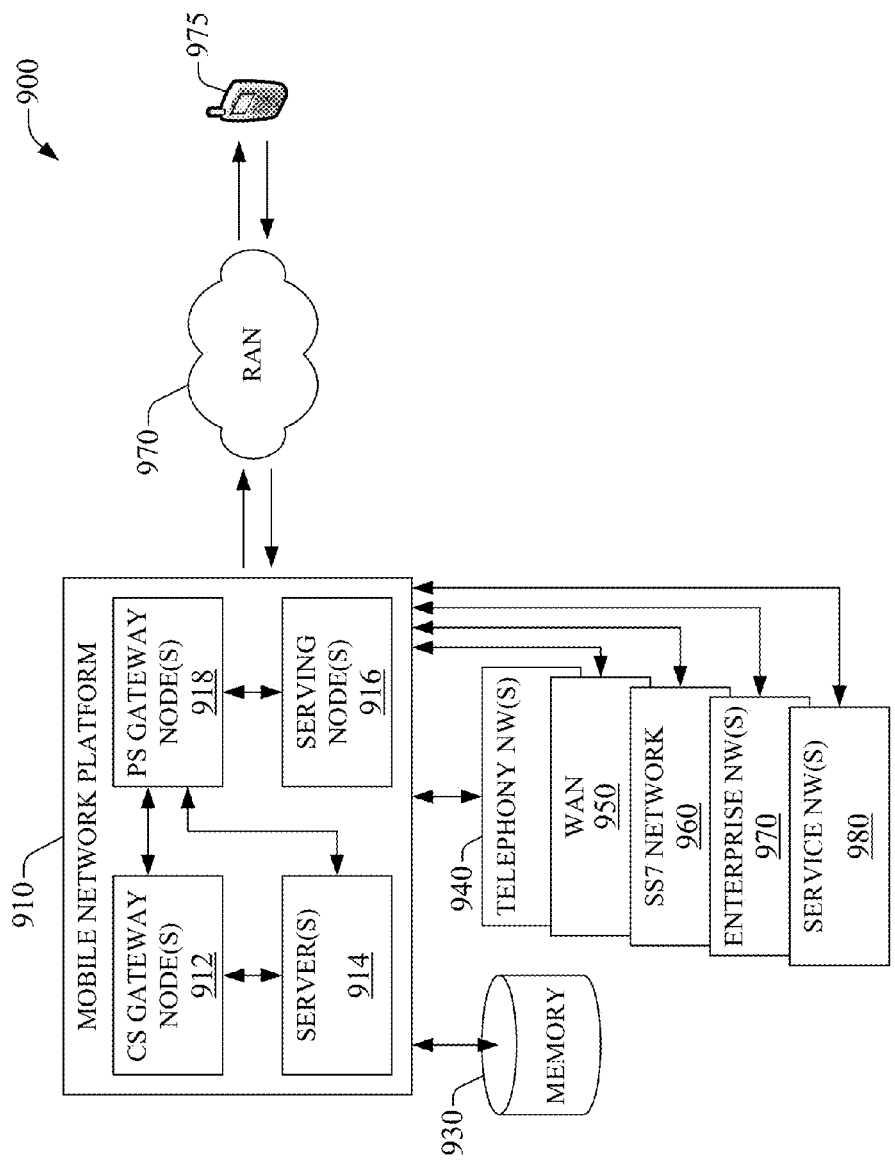
FIG. 9 is a block diagram of an exemplary embodiment of a mobile network platform to implement and exploit various features or aspects of the disclosed subject matter.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In the disclosed subject matter, in addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 9100, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto cell network(s) (not shown) that enhance wireless service coverage within indoor confined spaces and offload RAN resources in order to enhance subscriber service experience within a home or business environment. Server(s) 914 can embody, at least in part, TFL platform 49 and any component(s) therein It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. In particular, memory 930 can include contents of memory 440 in example system 400. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970.

In order to provide a context for the various aspects of the disclosed subject matter, FIG. 9, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 920, non-volatile memory 922 (see below), disk storage 924 (see below), and memory storage 946 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
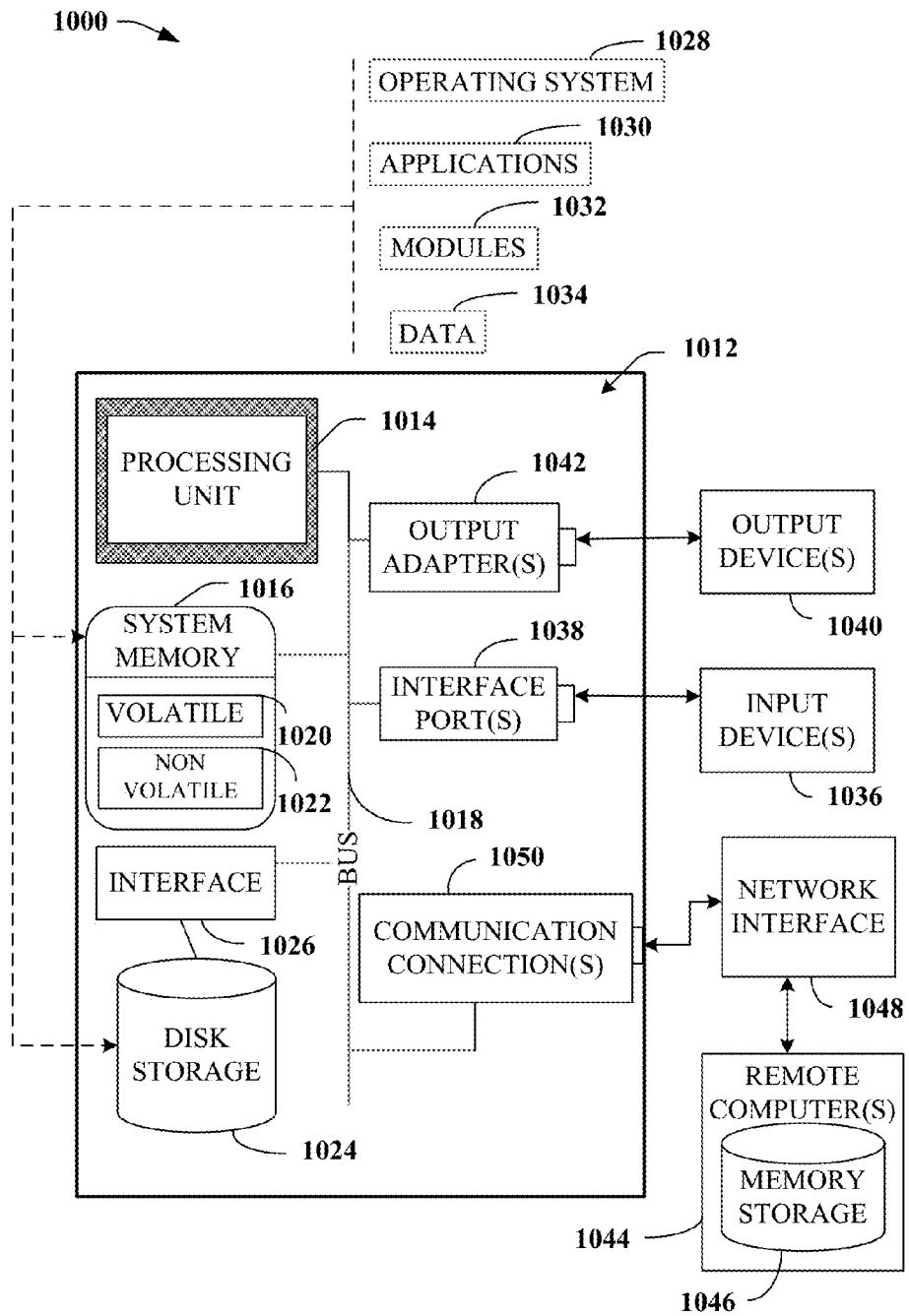
FIG. 10 illustrates a block diagram of a computing system 1000 operable to execute the disclosed systems and methods in accordance with an embodiment.

FIG. 10 illustrates a block diagram of a computing system 1000 operable to execute the disclosed systems and methods in accordance with an embodiment. Computer 1012 (which can be, for example, part of the hardware of a timed fingerprint location environment), includes a processing unit 1014, a system memory 1016, and a system bus 10110. System bus 10110 couples system components including, but not limited to, system memory 1016 to processing unit 1014. Processing unit 1014 can be any of various available processors. Dual microprocessors and other multiprocessor architectures also can be employed as processing unit 1014.

System bus 10110 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 11104), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 10110, a removable or non-removable interface is typically used, such as interface 1026. For example, disk storage 1024 can store one or more TFL lookup tables facilitating lookup of location information based on NodeB site pairs and time values.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 10210 (e.g., OS component(s) 312, etc.) Operating system 10210, which can be stored on disk storage 1024, acts to control and allocate resources of computer system 1012. System applications 1030 take advantage of the management of resources by operating system 10210 through program modules 1032 and program data 1034 stored either in system memory 1016 or on disk storage 1024. It is to be noted that the disclosed subject matter can be implemented with various operating systems or combinations of operating systems.

A user can enter commands or information into computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 10110 by way of interface port(s) 10310. Interface port(s) 10310 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 10110. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 10410 and then physically connected by way of communication connection 1050. Network interface 10410 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 10410 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically providing some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

issuing, by a system comprising a processor, a command for a first mobile device to perform an assisted global positioning system location determination;

receiving, by the system, a response from the first mobile device comprising a result of the assisted global positioning system location determination and a first time at which the result was determined by the first mobile device;

receiving, by the system, reports from mobile devices comprising signal information indicating arrival times of signals that were respectively received by the mobile devices from three base station devices;

identifying, by the system, a first report of the reports comprising first signal information indicating first arrival times of first signals that were received by the first mobile device from the three base station devices at the first time, and based on the identifying:

determining, by the system, first observed time difference of arrival measurements for respective pairs of the three base station devices based on the first signal information;

determining, by the system, an approximate location of the first mobile device at the first time based on the first observed time difference of arrival measurements;

determining, by the system, first error values respectively associated with the first observed time difference of arrival measurements based on a difference between the approximate location and the result of the global positioning system location determination;

storing, by the system, error information respectively associating the first error values with the respective pairs of the three base station devices; and employing the first error values to calibrate a subsequent approximate location determination for the first mobile device based on a second observed time difference of arrival measurement determined for the respective pairs of the three base station devices.

2. The method of claim 1, wherein the determining the approximate location of the first mobile device includes employing timed fingerprinting.

3. The method of claim 1, wherein the the response is included in a radio resource control report received from the first mobile device.

4. The method of claim 1, wherein the reports comprise radio access network application part reports.

5. The method of claim 1, further comprising:
employing, by the system, the first errors values to calibrate a subsequent approximate location determination for a second mobile device based on a third observed time difference of arrival measurement determined for the respective pairs of the three base station devices.

6. The method of claim 1, wherein the receiving the first report and the second report is based on the first mobile device being in an active CELL_DCH state.

7. The method of claim 1, wherein the assisted global positioning system location determination was made by the first mobile device at the first time based on the issuing of the command.

8. A method, comprising:
sending, by a system comprising a processor, a request to a first mobile device to perform an assisted global positioning system location determination for the mobile device;
receiving, by the system, a response from the first mobile device comprising a result of the assisted global positioning system location determination and a first time at which the result was determined by the first mobile device;
receiving, by the system, reports from mobile devices comprising signal information indicating arrival times of signals that were respectively received by the mobile devices from three base station devices;
identifying, by the system, a first report of the reports comprising first signal information indicating first arrival times of first signals that were received by the first mobile device from the three base station devices at substantially the first time, and based on the at the first time identifying:
determining, by the system, first observed time difference of arrival measurements for respective pairs of the three base station devices based on the first signal information;
determining, by the system, an approximate location of the first mobile device at the first time based on the first observed time difference of arrival measurements;
determining, by the system, first error values respectively associated with the first observed time difference of arrival measurements based a difference between the approximate location and the location determined according to the assisted global positioning system location determination;
storing, by the system, error information respectively associating the first error values with the respective pairs of the three base station devices; and
employing, by the system, a first error value of the first error values associated with a first pair of the respective pairs of the three base station devices to calibrate a subsequent approximate location determination for a second mobile device based on a second observed time difference of arrival measurement determined for the first pair of the respective pairs of the three base station devices.

9. The method of claim 8, further comprising:
determining, by the system, a median error value for the first pair of the respective pairs of the three base station devices based on error values comprising the first error value and additional error values respectively associated with the first pair of the respective pairs of the three base station devices.

10. The method of claim 9, further comprising:
determining, by the system, a set of the error values associated with the first pair of the respective pairs of the three base station devices that constitute outliers based on the median error; and
disassociating, by the system, the set of the error values that constitute the outliers from the first pair of the respective pairs of the three base station devices.

11. The method of claim 8, wherein the determining the approximate location of the first mobile device includes employing timed fingerprinting.

12. The method of claim 8, wherein the is included in a radio resource control report provided by the first mobile device.

13. The method of claim 8, wherein the reports comprise radio access network application part reports.

14. The method of claim 8, further comprising:
employing, by the system, the first error value to calibrate a subsequent approximate location determination for the first mobile device based on a third observed time difference of arrival measurement determined for the first pair of the respective pairs of the three base station devices.

15. The method of claim 8, wherein the assisted global positioning system location determination was made by the first mobile device at the first time based on the sending of the request.

16. A non-transitory machine-readable storage medium comprising executable instructions that, when executed by a processor, facilitate performance of operations, comprising:
commanding mobile devices to perform assisted global positioning system location determinations;
receiving responses from the mobile device comprising results of the assisted global positioning system location determinations and first times at which the results were respectively determined by the mobile devices;
receiving reports from the mobile devices comprising signal information indicating arrival times of signals that were respectively received by the mobile devices from three base station devices;
identifying a group of the reports of the reports comprising first signal information indicating arrival times of signals that were received by respective ones of the mobile devices from the three base station devices at or near the first times, and based on the at the first time identifying:

determining first observed time difference of arrival measurements for respective pairs of the three base station devices based on the first signal information;

determining first locations of the respective ones of the mobile devices at the first times based on the observed time difference of arrival measurements;

determining errors respectively associated with the first observed time difference of arrival measurements based on comparison of the first locations and the results of the assisted global positioning system location determinations for the respective ones of the mobile devices; and storing information respectively associating the errors with the respective pairs of the three base station devices; and employing the errors to calibrate a subsequent approximate location determination for a mobile device other than the mobile devices based on a second observed time difference of arrival measurement determined for the respective pairs of the three base station devices.

17. The non-transitory machine-readable storage medium of claim 16, the operations further comprising:

determining mean error rates for the respective pairs of the three base station devices based on the errors respectively associated therewith; and employing the mean error rates to calibrate the subsequent approximate location determination for the mobile device based on the second observed time difference of arrival measurements.

18. The non-transitory machine-readable storage medium of claim 16, wherein the respective ones of the mobile devices performed the assisted global positioning system location determinations at the first times based on the commanding.

* * * * *